US012731940B2

(12) United States Patent
Aoyama

(10) Patent No.: US 12,731,940 B2
(45) Date of Patent: Sep. 8, 2026

(54) INTERLOCK CONNECTOR-EQUIPPED COVER

(71) Applicant: SUMITOMO WIRING SYSTEMS, LTD., Mie (JP)

(72) Inventor: Naoki Aoyama, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 344 days.

(21) Appl. No.: 18/692,740

(22) PCT Filed: Sep. 7, 2022

(86) PCT No.: PCT/JP2022/033532
§ 371 (c)(1),
(2) Date: Mar. 15, 2024

(87) PCT Pub. No.: WO2023/047955
PCT Pub. Date: Mar. 30, 2023

(65) Prior Publication Data

US 2025/0079754 A1 Mar. 6, 2025

(30) Foreign Application Priority Data

Sep. 27, 2021 (JP) ................................ 2021-156489

(51) Int. Cl.
*H01R 13/52* (2006.01)
*H01R 13/631* (2006.01)
*H01R 13/707* (2006.01)

(52) U.S. Cl.
CPC ..... *H01R 13/5213* (2013.01); *H01R 13/6315* (2013.01); *H01R 13/707* (2013.01)

(58) Field of Classification Search
CPC ............ H01R 13/5213; H01R 13/6315; H01R 13/707
See application file for complete search history.

(56) References Cited

U.S. PATENT DOCUMENTS

2002/0039862 A1 4/2002 Nishide
2003/0163171 A1* 8/2003 Kast ...................... H01R 24/58 607/36

(Continued)

FOREIGN PATENT DOCUMENTS

JP 2002-289305 A 10/2002
JP 2021-012859 A 2/2021

OTHER PUBLICATIONS

International Search Report issued on Dec. 6, 2022 for WO 2023/047955 A1 (6 pages).

*Primary Examiner* — Phuong K Dinh
(74) *Attorney, Agent, or Firm* — Venjuris, P.C.

(57) ABSTRACT

An interlock connector-equipped cover includes: a cover portion that includes a seal member and an interlock connector that is held on the seal member. The interlock connector includes a fitting portion that is to be mated with a partner connector and a plate-shaped attachment portion, and the seal member includes a connector holding portion that movably holds the interlock connector. The attachment portion includes a first side portion, a second side portion, and an erroneous mounting preventing protrusion portion. The connector holding portion includes a first guide groove and a second guide groove, a farther-side receiving portion, and a coming-off preventing elastic piece. The connector holding portion includes an erroneous mounting preventing recessed portion that is formed so as to be continuous to the first guide groove at a position displaced in a direction that intersects a first direction, and receives the erroneous mounting preventing protrusion portion.

8 Claims, 16 Drawing Sheets

(56) References Cited

U.S. PATENT DOCUMENTS

| | | | | |
|---|---|---|---|---|
| 2005/0157087 | A1* | 7/2005 | Silverbrook | H01R 12/79 347/59 |
| 2010/0033291 | A1 | 2/2010 | Beckert et al. | |
| 2012/0285718 | A1 | 11/2012 | Sakakura | |
| 2015/0222046 | A1 | 8/2015 | Akiguchi et al. | |
| 2020/0251850 | A1 | 8/2020 | Wakimoto | |
| 2020/0403351 | A1 | 12/2020 | Yokotani | |
| 2022/0278479 | A1 | 9/2022 | Miyamoto | |
| 2022/0320762 | A1 | 10/2022 | Tachi et al. | |

* cited by examiner

INTERLOCK CONNECTOR-EQUIPPED COVER

CROSS REFERENCE TO RELATED APPLICATIONS

This application is a national phase of PCT application No. PCT/JP2022/033532, filed on 7 Sep. 2022, which claims priority from Japanese patent application No. 2021-156489, filed on 27 Sep. 2021, all of which are incorporated herein by reference.

TECHNICAL FIELD

The present disclosure relates to an interlock connector-equipped cover.

BACKGROUND

Patent Document 1 discloses a seal cover for closing an opening portion provided in a device in which a standby connector is disposed, the standby connector including a standby terminal for switching a state of an energizing circuit between a conductive state and a non-conductive state, the seal cover comprising: a lid for covering an opening of the opening portion; a fitting disposed on a back surface of the lid and configured to be fit into the opening portion; and an interlock connector projecting from the fitting, the interlock connector being configured and disposed to be connectable to the standby connector. The interlock connector includes a connector housing made of a synthetic resin, a pair of female terminals accommodated in the connector housing, and a coated wire that connects the pair of female terminals. The interlock connector is held on the fitting in a floating state to be displaceable in a direction perpendicular to the connecting direction.

PRIOR ART DOCUMENT

Patent Document

Patent Document 1: Japanese Patent Application No. 2015-220572 (JP 2017-091809 A)

SUMMARY OF THE INVENTION

Problems to be Solved

Due to space limitation of a device in which a standby connector is disposed, or the like, there is a desire to reduce the length of protrusion of an interlock connector from a fitting.

In addition, there is a desire to suppress erroneous mounting of the interlock connector when the interlock connector is attached to the fitting.

In view of this, objects of the present disclosure are to reduce the protrusion amount of the interlock connector, and to suppress erroneous mounting of the interlock connector.

Means to Solve the Problem

An interlock connector-equipped cover according to the present disclosure is an interlock connector-equipped cover that is to be attached to an attachment target including an opening portion, and covers the opening portion, and includes: a cover portion that includes a seal member that is fitted into the opening portion and closes the opening portion, and an interlock connector that is supported by the seal member and is for ensuring attachment of the cover portion to the attachment target, the interlock connector including: a fitting portion that extends from the seal member toward a partner connector in the attachment target and is to be mated with the partner connector, and a plate-shaped attachment portion that extends from a base end of the fitting portion along a virtual floating plane intersecting a fitting direction of the fitting portion, the seal member including a connector holding portion that holds the interlock connector so as to allow the interlock connector to move along the virtual floating plane, the attachment portion including: a first side portion, a second side portion that is on the opposite side to the first side portion, and an erroneous mounting preventing protrusion portion that protrudes from the first side portion in a direction intersecting the first side portion, the connector holding portion including: a first guide groove and a second guide groove for respectively guiding the first side portion and the second side portion along a first direction extending along the virtual floating plane, a farther-side receiving portion for regulating a position of the attachment portion on one side along the first direction, and a coming-off preventing elastic piece that has a coming-off preventing protrusion portion on a leading end thereof, and prevents and restricts coming-off of the attachment portion on the other side along the first direction, the attachment portion being movable within a range restricted between the farther-side receiving portion and the coming-off preventing protrusion portion in the first direction, and being movable within a range restricted between a bottom surface of the first guide groove and a bottom surface of the second guide groove in a second direction that intersects the first direction on the virtual floating plane, in a state where the first side portion and the second side portion are respectively guided by the first guide groove and the second guide groove and the attachment portion is held on the connector holding portion, and the connector holding portion further including an erroneous mounting preventing recessed portion that is formed so as to be continuous to the first guide groove at a position displaced relative to the first guide groove in a direction that intersects the first direction, and receives the erroneous mounting preventing protrusion portion.

Effect of the Invention

According to the present disclosure, it is possible to reduce the protrusion amount of an interlock connector, and to suppress erroneous mounting of the interlock connector.

DETAILED DESCRIPTION TO EXECUTE THE INVENTION

Figure 1:
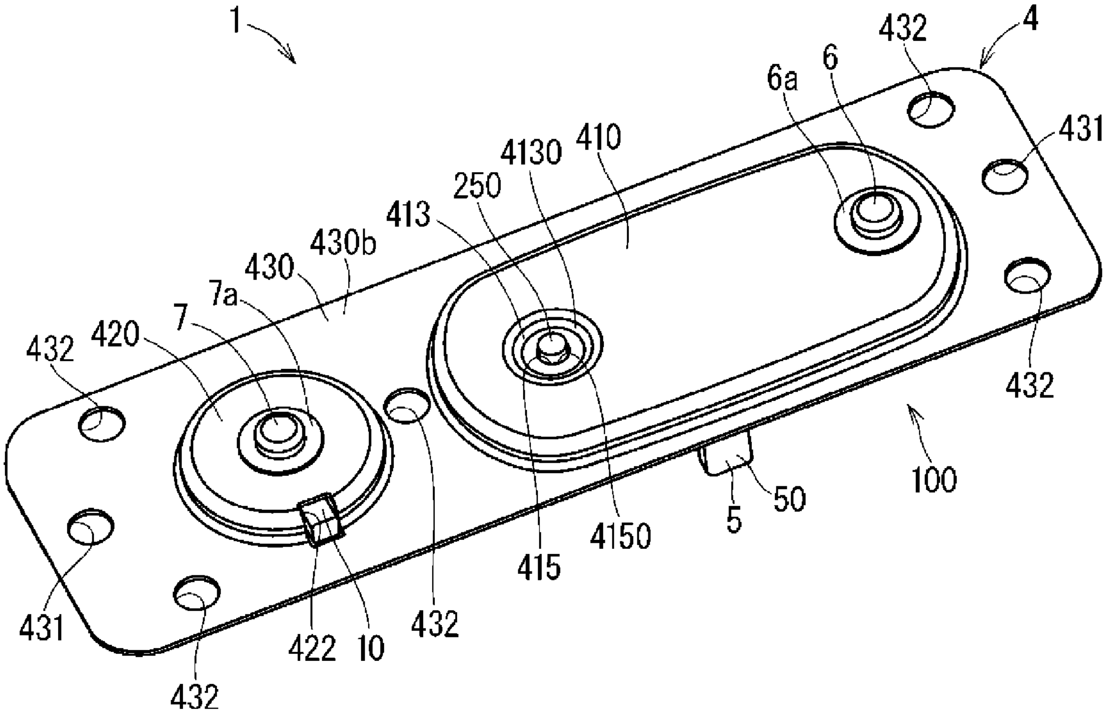
FIG. 1 is a schematic perspective view showing an example of an interlock connector-equipped cover.

Description of Embodiments of the Present Disclosure

First, embodiments of the present disclosure will be listed and described.

An interlock connector-equipped cover according to the present disclosure will be described as follows.

(1) An interlock connector-equipped cover that is to be attached to an attachment target including an opening portion, and covers the opening portion, and includes: a cover portion that includes a seal member that is fitted into the opening portion and closes the opening portion, and an interlock connector that is supported by the seal member and is for ensuring attachments of the cover portion to the attachment target, the interlock connector including: a fitting portion that extends from the seal member toward a partner connector in the attachment target and is to be mated with the partner connector, and a plate-shaped attachment portion that extends from a base end of the fitting portion along a virtual floating plane intersecting a fitting direction of the fitting portion, the seal member including a connector holding portion that holds the interlock connector so as to allow the interlock connector to move along the virtual floating plane, the attachment portion including; a first side portion, a second side portion that is on the opposite side to the first side portion, and an erroneous mounting preventing protrusion portion that protrudes from the first side portion in a direction intersecting the first side portion, the connector holding portion including: a first guide groove and a second guide groove for respectively guiding the first side portion and the second side portion along a first direction extending along the virtual floating plane, a farther-side receiving portion for regulating a position of the attachment portion on one side along the first direction, and a coming-off preventing elastic piece that has a coming-off preventing protrusion portion on a leading end thereof, and prevents and restricts coming-off of the attachment portion on the other side along the first direction, the attachment portion being movable within a range restricted between the farther-side receiving portion and the coming-off preventing protrusion portion in the first direction, and being movable within a range restricted between a bottom surface of the first guide groove and a bottom surface of the second guide groove in a second direction that intersects the first direction on the virtual floating plane, in a state where the first side portion and the second side portion are respectively guided by the first guide groove and the second guide groove and the attachment portion is held on the connector holding portion, and the connector holding portion further including an erroneous mounting preventing recessed portion that is formed so as to be continuous to the first guide groove at a position displaced relative to the first guide groove in a direction that intersects the first direction, and receives the erroneous mounting preventing protrusion portion.

With the above interlock connector-equipped cover, the attachment portion is supported by the connector holding portion so as to be movable along the first direction and the second direction, and thus the interlock connector is supported by the seal member so as to be movable along the virtual floating plane. The attachment portion is a plate-shaped attachment portion that protrudes from the base end of the fitting portion along the virtual floating plane that intersects the fitting direction of the fitting portion, and thus it is possible to reduce the protrusion amount of the interlock connector. In addition, when the first side portion is inserted into the first guide groove and the second side portion is inserted into the second guide groove, the erroneous mounting preventing protrusion portion is received by the erroneous mounting preventing recessed portion, but, conversely, when the first side portion is inserted into the second guide groove and the second side portion is inserted into the first guide groove, the erroneous mounting preventing protrusion portion interferes with the opening of the second guide groove. Accordingly, erroneous mounting of the interlock connector is suppressed.

(2) In the interlock connector-equipped cover according to (1), the cover portion may include: a shield cover that includes a through hole and is to be fixed to the attachment target, and a screw that passes through the through hole and is fixed to the seal member, there may be a clearance in the through hole, and the seal member may be movable relative to the shield cover along the virtual floating plane in accordance with the clearance.

Accordingly, even if there is an error between a position at which the shield cover is attached to the attachment target and a position at which the seal member is attached to the opening portion, such an error can be resolved due to the clearance between the screw and the shield cover. Even if there is an error between a position at which the seal member is attached to the opening portion and a position at which the interlock connector is mated with the partner connector, such an error can be resolved due to a floating supporting structure of the interlock connector.

(3) In the interlock connector-equipped cover according to (1) or (2), setting may be performed such that the first side portion comes into contact with the bottom surface of the first guide groove or the second side portion comes into contact with the bottom surface of the second guide groove before or at the same time as the erroneous mounting preventing protrusion portion coming into contact, in the second direction, with a surface of the erroneous mounting preventing recessed portion, in a state where the erroneous mounting preventing protrusion portion is positioned in the erroneous mounting preventing recessed portion.

Accordingly, before or at the same time as the erroneous mounting preventing protrusion portion coming into contact with the surface of the erroneous mounting preventing recessed portion, the first side portion comes into contact with the bottom surface of the first guide groove or the second side portion comes into contact with the bottom surface of the second guide groove, and thus an unreasonable force is unlikely to act on the erroneous mounting preventing protrusion portion.

(4) In the interlock connector-equipped cover according to any one of (1) to (3), portions on the one side in the first direction of the first side portion and the second side portion may be formed as attachment guide surfaces whose widths gradually decrease from the other side in the first direction toward the one side. Accordingly, the attachment portion can be easily inserted into the first guide groove and the second guide groove.

(5) In the interlock connector-equipped cover according to any one of (1) to (4), an amount by which the attachment portion is movable between the farther-side receiving portion and the coming-off preventing protrusion portion in the first direction and an amount by which the attachment portion is movable between the bottom surface of the first guide groove and the bottom surface of the second guide groove in the second direction may be larger than an amount by which the first side portion and the second side portion are respectively movable in the first guide groove and the second guide groove in the fitting direction. Accordingly, in the fitting direction, the interlock connector can be moved along the virtual floating plane in accordance with the position of the partner connector while the connector holding portion supports the interlock connector at a fixed position to a certain degree.

(6) In the interlock connector-equipped cover according to any one of (1) to (5), the fitting portion may include a first tubular terminal, a second tubular terminal, a terminal coupling portion that electrically connects the first tubular terminal and the second tubular terminal, and a terminal housing portion that accommodates the first tubular terminal and the second tubular terminal, and the first tubular terminal, the second tubular terminal, and the terminal coupling portion may be integrally formed by pressing a metal plate. Accordingly, it is possible to easily manufacture a terminal unit in which the first tubular terminal and the second tubular terminal are electrically connected, and the terminal unit can be easily accommodated in the terminal housing portion.

(7) In the interlock connector-equipped cover according to (6), the terminal coupling portion may intersect a direction in which the first tubular terminal and the second tubular terminal are aligned, and extend in a direction that intersects the fitting direction. Accordingly, it is possible to reduce the size in the fitting direction of the terminal coupling portion. Accordingly, it is possible to further reduce the protrusion length of the interlock connector.

Detailed Embodiments of Present Disclosure

Specific examples of an interlock connector-equipped cover according to the present disclosure will be described below with reference to the drawings. Note that the present disclosure is not limited to these examples, but rather is indicated by the claims, and is intended to include all modifications that are within the meanings and the scope that are equivalent to those of the claims.

Embodiment

Figure 2:
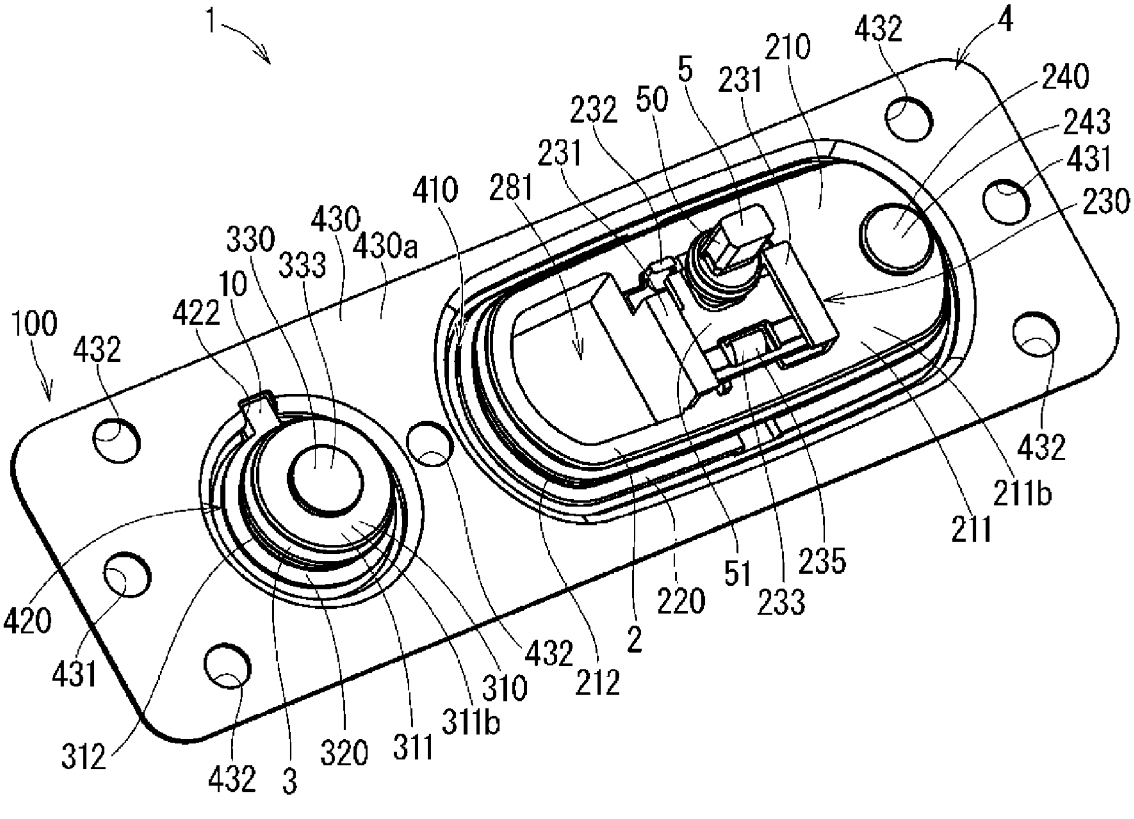
FIG. 2 is a schematic perspective view showing an example of the interlock connector-equipped cover.
Figure 3:
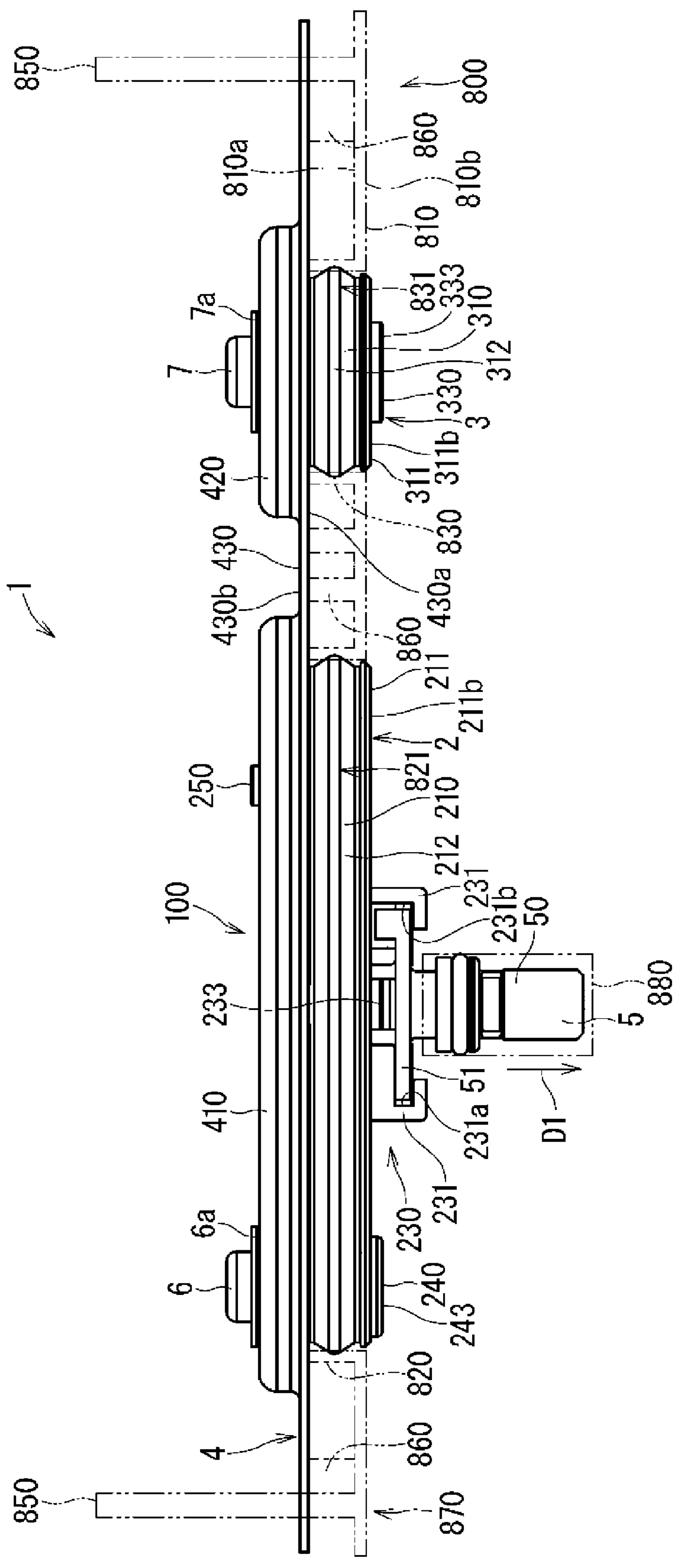
FIG. 3 is a schematic side view showing an example of the interlock connector-equipped cover.
Figure 4:
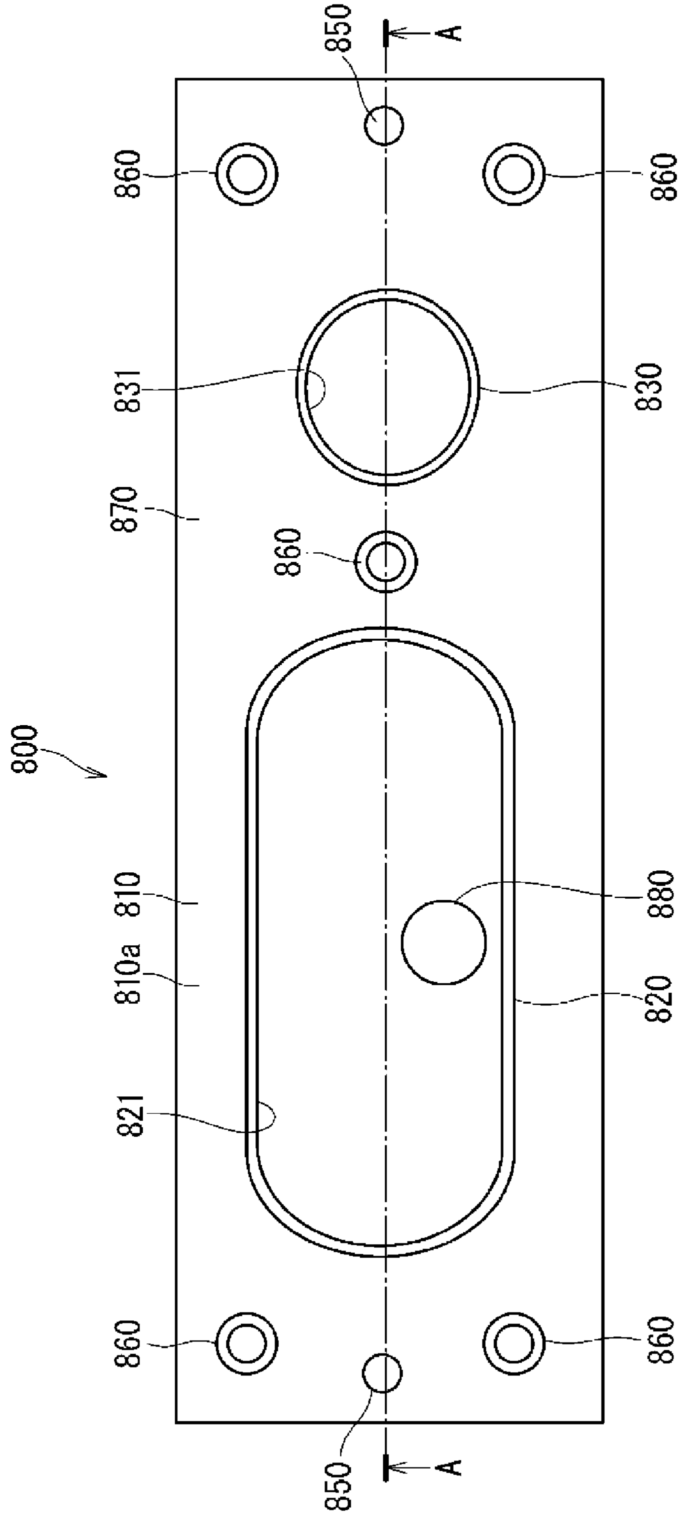
FIG. 4 is a schematic plan view showing an example of an attachment target.

FIG. 1 is a schematic perspective view showing an example of an interlock connector-equipped cover. FIG. 2 is a schematic perspective view showing an example of the interlock connector-equipped cover 1 as viewed from the opposite side to that in FIG. 1. FIG. 3 is a schematic side view showing an example of the interlock connector-equipped cover 1. FIG. 4 is a schematic plan view showing an example of an attachment target 800 to which the interlock connector-equipped cover 1 is attached. In FIG. 3, a cross-sectional structure of the attachment target 800 taken along the arrow A-A shown in FIG. 4 is indicated by a dashed double-dotted line.

<Overview of Interlock Connector-Equipped Cover>

As shown in FIGS. 3 and 4, the attachment target 800 to which the interlock connector-equipped cover 1 is attached includes a first opening portion 821 (also simply referred to as an "opening portion 821") and a second opening portion 831 (also simply referred to as an "opening portion 831"), for example. The second opening portion 831 is aligned with the first opening portion 821, and is smaller than the first opening portion 821. In addition, the attachment target 800 includes a partner connector 880 that is to be mated with the interlock connector 5 of the interlock connector-equipped cover 1.

The interlock connector-equipped cover 1 covers the opening portions 821 and 822 of the attachment target 800. As shown in FIGS. 1 to 3, the interlock connector-equipped cover 1 includes a cover portion 100 and the interlock connector 5 (also simply referred to as the "connector 5").

The cover portion 100 includes a first seal member 2 (also simply referred to as a "seal member 2") and a second seal member 3 (also simply referred to as a "seal member 3"). The first seal member 2 includes a first seal portion 210 (also simply referred to as a "seal portion 210") that is fitted into the first opening portion 821, and seals the first opening portion 821. The second seal member 3 includes a second seal portion 310 (also simply referred to as a "seal portion 310") that is fitted into the second opening portion 831 and seals the second opening portion 831. In the present embodiment, the cover portion 100 includes the plurality of seal members 2 and 3 in order to close the plurality of opening portions 821 and 822. It is conceivable that, in a case where a cover portion closes one opening portion, the cover portion is configured to include one seal member.

In the present embodiment, the cover portion 100 includes a shield cover 4. The shield cover 4 is fixed to the attachment target 800, and electromagnetically shields the opening portions 821 and 831, for example. The cover portion 100 may be omitted. In this case, the first seal member 2 or the second seal member 3 may be directly fixed to the attachment target 800 through screwing or the like.

The interlock connector 5 is attached to the first seal member 2, for example, and ensures attachment of the interlock connector-equipped cover 1 to the attachment target 800.

As a result of the opening portions 821 and 822 of the attachment target 800 being respectively sealed by the first seal member 2 and the second seal member 3 of the interlock connector-equipped cover 1 in a collective manner, water, an extraneous material, and the like are unlikely to enter the attachment target 800 from the opening portions 821 and 822. Furthermore, as a result of the opening portions 821 and 822 being covered by the shield cover 4, unnecessary electromagnetic waves are unlikely to enter the attachment target 800 from the opening portions 821 and 822, and unnecessary electromagnetic waves are unlikely to be radiated to the outside from the opening portions 821 and 822.

Configuration Example of Attachment Target

The attachment target 800 includes a roughly plate-shaped attachment portion 870 to which the interlock connector-equipped cover 1 is to be attached, and the partner connector 880 (also simply referred to as the "connector 880") that is to be mated with the interlock connector 5 of the interlock connector-equipped cover 1, for example. The attachment portion 870 is made of metal such as aluminum or iron. The attachment portion 870 constitutes a portion of a housing for accommodating a plurality of components that include the partner connector 880, for example.

The attachment portion 870 includes a plate-shaped base portion 810, a first tubular portion 820, a second tubular portion 830, one or more regulation pins 850, and one or more bosses 860, which are joined to the base portion 810, for example.

The base portion 810 extends outward in a plane from the outer circumferential walls of the first tubular portion 820 and the second tubular portion 830. The outer shape of the base portion 810 is rectangular, for example. The base portion 810 includes a main surface 810*a* and a main surface 810*b* that are parallel to each other.

The first tubular portion 820 and the second tubular portion 830 are provided upright on the main surface 810*a* of the base portion 810. The first tubular portion 820 (also simply referred to as the "tubular portion 820") forms the first opening portion 821. The first opening portion 821 is formed by a hollow portion inside the first tubular portion 820. In other words, the first opening portion 821 is formed by space surrounded by the first tubular portion 820. The second tubular portion 830 (also simply referred to as the "tubular portion 830") forms the second opening portion 831. The second opening portion 831 is formed by a hollow portion inside the second tubular portion 830. The opening portions 821 and 831 are tubular holes, and pass through the base portion 810.

The outer shape of the opening portion 821 in planar view is elliptical, for example. The outer shape of the opening portion 831 in planar view is circular (specifically, exact circular), for example. The opening portion 831 is smaller than the opening portion 821. The opening area of the opening portion 831 is smaller than the opening area of the opening portion 821. The opening portions 821 and 831 are aligned along the longitudinal direction of the base portion 810, for example. The longitudinal direction of the elliptical opening portion 831 extends along a direction in which the opening portions 821 and 831 are aligned, in other words, the longitudinal direction of the base portion 810.

When the opening portion 821 is viewed from the main surface 810*a* side, the connector 880 is exposed from the opening portion 821. The connector 880 can be visually recognized when the opening portion 821 is viewed from the main surface 810*a* side. The connector 5 of the interlock connector-equipped cover 1 is mated with the connector 880 from a direction perpendicular to the main surface 810*a*. A fitting direction D1 in which the connector 5 is mated with the connector 880 (see FIG. 3) is a direction perpendicular to the main surfaces 810*a* and 810*b*. The fitting direction D1 is also a direction that extends along the thickness direction of the base portion 810.

One or more regulation pins 850 are provided upright on the main surface 810*a* of the base portion 810, for example. The regulation pins 850 extend along the direction perpendicular to the main surface 810*a*. The regulation pins 850 protrude in the direction opposite to the fitting direction D1 of the connector 5. In this example, a plurality of regulation pins 850 are provided on the main surface 810*a*, but the number of regulation pins 850 may be one. Two regulation pins 850 are provided on the main surface 810*a*, for example.

The regulation pins 850 regulate the attachment position of the interlock connector-equipped cover 1 in a direction that extends along the main surface 810*a*. When a plane that intersects the fitting direction D1 in which the connector 5 is mated with the connector 880 is defined as one plane, the regulation pins 850 regulate the attachment position of the interlock connector-equipped cover 1 in a direction that extends along the one plane. Hereinafter, the one plane may be referred to as a "specific plane."

The two regulation pins 850 of the attachment target 800 are respectively provided at the two end portions in the longitudinal direction of the base portion 810, for example. The two regulation pins 850 are aligned along the longitudinal direction of the base portion 810, for example. The regulation pins 850 are provided at central portions of the two end portions in the longitudinal direction of the base portion 810, for example.

The one or more bosses 860 are provided upright on the main surface 810*a* of the base portion 810, for example. Fixing bolts for fixing the interlock connector-equipped cover 1 to the attachment portion 870 are screwed to the bosses 860. In this example, a plurality of bosses 860 are provided on the main surface 810*a*, but the number of bosses 860 may be one. Five bosses 860 are provided on the main surface 810*a*, for example. Four bosses 860 out of the five bosses 860 are respectively provided at the four corner portions of the main surface 810*a* of the base portion 810, for example. The one remaining boss 860 is positioned between the opening portion 821 and the opening portion 831, for example. The boss 860 positioned between the opening portion 821 and the opening portion 831 and the two regulation pins 850 are aligned along the longitudinal direction of the base portion 810, for example.

<Configuration Example of Interlock Connector-Equipped Cover>

Figure 5:
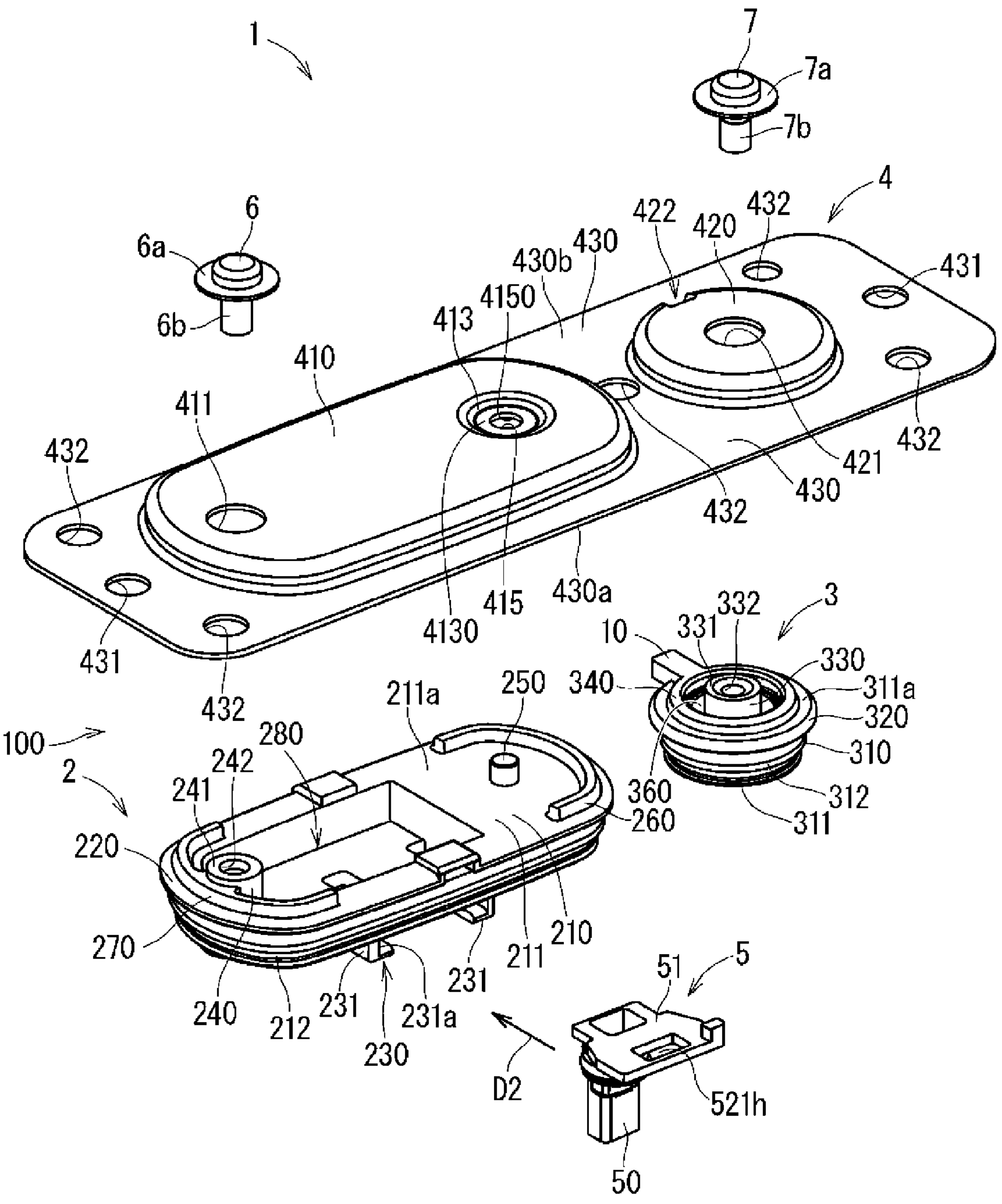
FIG. 5 is a schematic exploded perspective view showing an example of the interlock connector-equipped cover.
Figure 6:
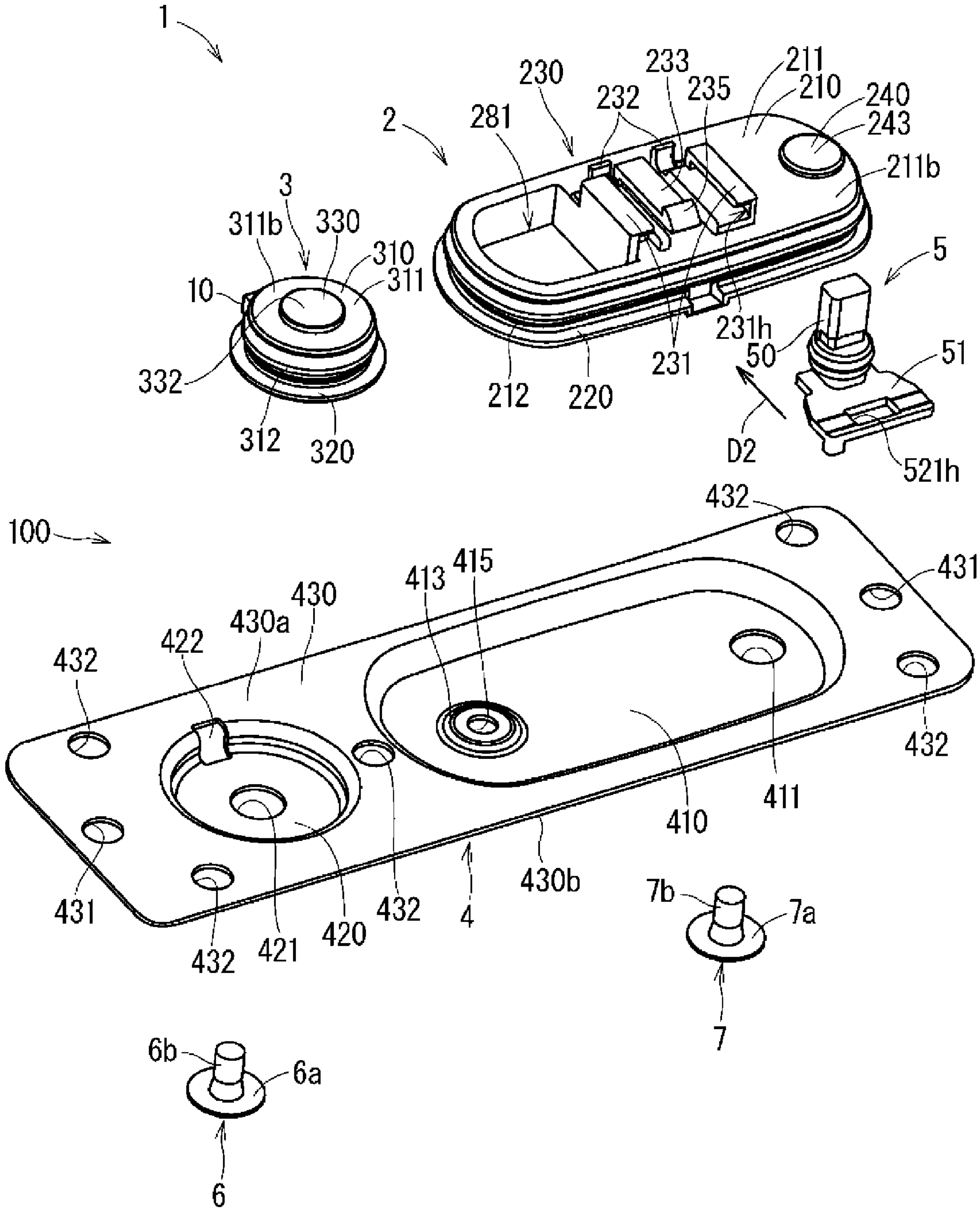
FIG. 6 is a schematic exploded perspective view showing an example of the interlock connector-equipped cover.

FIG. 5 is a schematic exploded perspective view showing an example of the interlock connector-equipped cover 1. FIG. 6 is a schematic exploded perspective view showing an example of the interlock connector-equipped cover 1 as viewed from the opposite side to that in FIG. 5. As shown in FIGS. 1 to 3, 5, and 6, the interlock connector-equipped cover 1 includes a first screw 6 (also simply referred to as a "screw 6") for attaching the first seal member 2 to the shield cover 4 and a second screw 7 (also simply referred to as a "screw 7") for attaching the second seal member 3 to the shield cover 4 in addition to the first seal member 2, the second seal member 3, the shield cover 4, and the interlock connector 5. The first screw 6 passes through the shield cover 4 and is attached to the first seal member 2. The second screw 7 passes through the shield cover 4, and is attached to the second seal member 3.

<Configuration Example of Shield Cover>

The shield cover 4 is formed by pressing a metal plate made of aluminum or iron, for example. The shield cover 4 includes a plate-shaped base portion 430 that is to be fixed to the attachment portion 870 of the attachment target 800, and a first placing recessed portion 410 and a second placing recessed portion 420 joined to the base portion 430, for example. The placing recessed portions 410 and 420 are dish-shaped recessed portions, for example. The first seal member 2 is disposed in the first placing recessed portion 410 (also simply referred to as the "placing recessed portion 410"), and the second seal member 3 is disposed in the second placing recessed portion 420 (also simply referred to as the "placing recessed portion 420").

The base portion 430 extends outward in a plane from the peripheral edges of the openings of the placing recessed portions 410 and 420. The outer shape of the base portion 430 is shaped as a rectangle, for example. The base portion 430 includes a main surface 430*a* and a main surface 430*b* that are parallel to each other.

The dish-shaped placing recessed portions 410 and 420 are recessed so as to protrude to the main surface 430*b* side of the base portion 430. Accordingly, the placing recessed portions 410 and 420 are open on the main surface 430*a* side of the base portion 430. The outer shape of the opening of the placing recessed portion 410 in planar view is elliptical, for example. The outer shape of the opening of the placing recessed portion 420 in planar view is circular (specifically, exact circular), for example. The opening of the placing recessed portion 420 is smaller than the opening of the placing recessed portion 410. That is to say, the opening area of the placing recessed portion 420 is smaller than the opening area of the placing recessed portion 410. The placing recessed portions 410 and 420 are aligned along the longitudinal direction of the base portion 430, for example. The longitudinal direction of the elliptical opening of the placing recessed portion 410 extends along the alignment direction of the placing recessed portions 410 and 420, in other words, the longitudinal direction of the base portion 430.

The base portion 430 includes a plurality of through holes 431 into which the plurality of regulation pins 850 of the attachment target 800 are respectively inserted. The through holes 431 pass through the base portion 430 in the thickness direction thereof. The base portion 430 includes two through holes 431, for example. The two through holes 431 are respectively provided in the two end portions in the longitudinal direction of the base portion 430, for example. The two through holes 431 are aligned along the longitudinal direction of the base portion 430, for example. The through holes 431 are provided in central portions of the end portions in the longitudinal direction of the base portion 430.

The base portion 430 includes a plurality of through holes 432 that pass through the base portion 430 in the thickness direction thereof. A plurality of fixing bolts that are screwed to the plurality of bosses 860 of the attachment target 800 are respectively inserted into the plurality of through holes 432. The base portion 430 includes five through holes 432, for example. Four through holes 432 out of the five through holes 432 are respectively provided at the four corner portions of the base portion 430, for example. The one remaining through hole 432 is positioned between the placing recessed portion 410 and the placing recessed portion 420, for example. The through hole 432 positioned between the placing recessed portion 410 and 420, and the two through holes 431 are aligned in the longitudinal direction of the base portion 430, for example. The shield cover 4 is fixed to the attachment portion 870 of the attachment target 800, for example, using five fixing bolts. The fixing bolts are inserted into the through holes 432 of the shield cover 4, and are screwed to the bosses 860 of the attachment target 800.

A through hole 411 into which the screw 6 is inserted is provided in the elliptical bottom portion of the placing recessed portion 410. The screw 6 is inserted into the through hole 411 from the main surface 430*b* side of the base portion 430, and is attached to the seal member 2 disposed on the placing recessed portion 410.

The bottom portion of the placing recessed portion 410 includes a dish-shaped recessed portion 413 that is recessed to the main surface 430*a* side. The dish-shaped recessed portion 413 is open to the main surface 430*b* side. The inner surface of the dish-shaped recessed portion 413 constitutes a recessed surface 4130. The recessed surface 4130 is provided in the surface of the shield cover 4. A through hole 415 into which a later-described regulating protrusion portion 250 of the seal member 2 is inserted is provided in the bottom portion of the dish-shaped recessed portion 413. An opening 4150 on the main surface 430*b* side of the through hole 415 is provided in the recessed surface 4130 of the dish-shaped recessed portion 413. Specifically, the opening 4150 is provided in the bottom portion of the recessed surface 4130. The regulating protrusion portion 250 of the seal member 2 protrudes from the opening 4150 to the outside of the shield cover 4.

A through hole 421 into which the screw 7 is inserted is provided in the circular bottom portion of the placing recessed portion 420. The screw 7 is inserted into the through hole 421 from the main surface 430*b* side of the base portion 430, and is attached to the seal member 3 disposed on the placing recessed portion 420. In addition, a rotation stop hole 422 into which a later-described rotation stop protrusion portion 10 is inserted is provided in a side surface portion of the placing recessed portion 420. The rotation stop hole 422 is a through hole that passes through a side surface portion of the placing recessed portion 420 in the thickness direction thereof, for example. The rotation stop protrusion portion 10 and the rotation stop hole 422 constitute a rotation stop structure for stopping rotation of the seal member 3. The rotation stop structure will be described later in detail.

<Configuration Example of First Seal Member>

The first seal member 2 is made of a resin, for example. The outer shape of the first seal member 2 in planar view as viewed from a direction perpendicular to a specific plane (that is to say, a plane that intersects the fitting direction D1) is elliptical, for example. The first seal member 2 includes the first seal portion 210, an annular flange portion 220 that protrudes outward from the peripheral edge of the first seal portion 210, a connector holding portion 230 for holding the connector 5, and a boss 240 to which the screw 6 is attached, for example. Furthermore, the first seal member 2 includes the regulating protrusion portion 250, and abutment ribs 260 and 270 that abut on the bottom portion of the first placing recessed portion 410 of the shield cover 4 when the first seal member 2 is disposed on the first placing recessed portion 410, for example.

The seal portion 210 that is fitted into the opening portion 821 of the attachment target 800 includes a main body portion 211 and a seal ring 212 attached to the main body portion 211, for example. The main body portion 211 is shaped as a slightly flat column, for example. The outer shape of the main body portion 211 in planar view as viewed from a direction perpendicular to the specific plane is elliptical in accordance with the outer shape of the opening portion 821 in planar view, for example. The seal ring 212 is attached to the side surface (in other words, the outer peripheral surface) of the main body portion 211. Specifically, an annular groove is formed in the side surface of the main body portion 211, and the seal ring 212 is fitted into the annular groove. In a state where the seal portion 210 is fitted into the opening portion 821, the seal ring 212 comes into intimate contact with the inner circumferential wall of the opening portion 821 (in other words, the inner periphery surface of the tubular portion 820) in a watertight manner, and the opening portion 821 is sealed by the seal portion 210. The main body portion 211, the flange portion 220, the connector holding portion 230, the boss 240, the regulating protrusion portion 250, the abutment rib 260 and the abutment rib 270 are integrally formed, for example.

The main body portion 211 includes planes 211*a* and 211*b* that are parallel to each other. The seal member 2 is disposed in the placing recessed portion 410 such that the flat surface 211*a* of the main body portion 211 is positioned on the placing recessed portion 410 side of the shield cover 4. The main body portion 211 includes a thinned portion 280 that is open in the flat surface 211*a* and a thinned portion 281 that is open in the flat surface 211*b*.

The flange portion 220 extends outward from an end portion on the flat surface 211*a* side of the peripheral side surface of the main body portion 211, so as to surround the end portion. The flange portion 220 has an elliptical annular shape in accordance with the outer shape of the main body portion 211 in planar view.

The abutment ribs 260 and 270 are provided upright on the flat surface 211*a* of the main body portion 211. The abutment rib 260 is provided at one end portion in the longitudinal direction of the flat surface 211*a* of the main body portion 211. The abutment rib 270 is provided at the other end portion in the longitudinal direction of the flat surface 211*a* of the main body portion 211. The abutment ribs 260 and 270 extend in an arc shape along the outer edges of the end portions in the longitudinal direction of the flat surface 211*a*. In a state where the seal member 2 is disposed in the placing recessed portion 410, the abutment ribs 260 and 270 abut on the inner bottom surface of the placing recessed portion 410.

The boss 240 to which the screw 6 is attached is provided on the main body portion 211, for example. The boss 240 is positioned at one end portion in the longitudinal direction of the main body portion 211. The boss 240 is shaped as a hollow column, for example. The boss 240 extends from the flat surface 211*b* side to the flat surface 211*a* side along the thickness direction of the main body portion 211. There is the thinned portion 280 around the boss 240. A lower hole 242 is provided in the boss 240. The lower hole 242 is open in a leading end surface 241 of the boss 240. An outer bottom surface 243 of the boss 240 is closed, and protrudes outward of the flat surface 211*b* of the main body portion 211. When the seal member 2 is disposed in the placing recessed portion 410 of the shield cover 4, the boss 240 is inserted into the through hole 411 of the placing recessed portion 410 from the main surface 430*a* side. In a state where the boss 240 is inserted into the through hole 411, the boss 240 protrudes from the shield cover 4, and the leading end surface 241 of the boss 240 is positioned outside the shield cover 4. The leading end surface 241 is positioned outward of the outer surface of (in other words, the surface on the main surface 430*b* side) of the placing recessed portion 410.

The screw 6 is a tap screw (also referred to as a "tapping screw") that includes a washer head, for example. A screw portion 6*b* of the screw 6 is inserted into the lower hole 242 of the boss 240 inserted into the through hole 411 of the shield cover 4, from the main surface 430*b* side, and is then screwed into the boss 240. At this time, a washer 6*a* of the screw 6 abuts on the leading end surface 241 of the boss 240 that protrudes to the outside of the shield cover 4, and does not come into contact with the shield cover 4. Moreover, the diameter of the washer 6*a* is larger than the diameter of the through hole 411, and thus the screw 6 attached to the boss 240 is unlikely to come loose through the through hole 411 to the main surface 430*a* side. Accordingly, the seal member 2 is attached to the shield cover 4. The screw 6 is attached at a position displaced from the center of the seal member 2 to one side of the longitudinal direction of the seal member 2. In other words, the screw 6 is attached at a position displaced on one side in the alignment direction of the seal members 2 and 3, from the center of the seal member 2.

In this example, the outer bottom surface 243 of the boss 240 protrudes outward of the flat surface 211*b* of the main body portion 211, and thus it is possible to increase the thickness of the bottom portion of the boss 240. Accordingly, even when the screw 6 is excessively screwed to the boss 240, the leading end of the screw 6 is unlikely to protrude from the outer bottom surface 243 of the boss 240.

The regulating protrusion portion 250 is provided on the flat surface 211*a* of the main body portion 211. The regulating protrusion portion 250 has a columnar shape, for example. The regulating protrusion portion 250 is positioned, for example, at the other end portion in the longitudinal direction of the main body portion 211 (that is to say, the end portion on the opposite side to the side on which the boss 240 is positioned). The regulating protrusion portion 250 is positioned on the other side in the longitudinal direction of the seal member 2 (that is to say, on the opposite side to the side on which the boss 240 is positioned) relative to the center of the seal member 2. In other words, the regulating protrusion portion 250 is positioned displaced from the center of the seal member 2 to the other side in the alignment direction of the seal members 2 and 3. The regulating protrusion portion 250 is inserted into the through hole 415 of the placing recessed portion 410 from the main surface 430*a* side. The regulating protrusion portion 250 regulates rotation of the seal member 2. The operation of the regulating protrusion portion 250 will be described later in detail.

The connector holding portion 230 (also simply referred to as a "holding portion 230") holds the connector 5 so as to allow the connector 5 to move along a virtual floating plane. In the present embodiment, the virtual floating plane is parallel to the above specific plane. The virtual floating plane extends in a direction that intersects the fitting direction D1 when the connector 5 is mated with the connector 880, or, here, a direction perpendicular to the fitting direction D1. The connector holding portion 230 and the interlock connector 5 will be described later more in detail.

<Configuration Example of Second Seal Member>

The second seal member 3 is made of a resin, for example. The outer shape of the second seal member 3 in planar view as viewed from a direction perpendicular to the specific plane is circular (specifically, exact circular), for example. The second seal member 3 includes the second seal portion 310, an annular flange portion 320 that protrudes outward from the peripheral edge of the second seal portion 310, and a boss 330 to which the screw 7 is attached, for example. Furthermore, the second seal member 3 includes an abutment rib 340 that abuts on the bottom portion of the second placing recessed portion 420 when the second seal member 3 is disposed in the second placing recessed portion 420 of the shield cover 4, for example.

The seal portion 310 that is to be fitted into the opening portion 831 of the attachment target 800 includes a main body portion 311 and a seal ring 312 attached to the main body portion 311, for example. The main body portion 311 has a columnar shape, for example. The outer shape of the main body portion 311 in planar view as viewed from a direction perpendicular to the specific plane is circular (specifically, exact circular) in accordance with the outer shape of the opening portion 831 in planar view, for example. The seal ring 312 is attached to the side surface of the main body portion 311. Specifically, an annular groove is provided in the side surface of the main body portion 311, and the seal ring 312 is fitted into the annular groove. In a state where the seal portion 310 is fitted into the opening portion 831, the seal ring 312 comes into intimate contact with the inner circumferential wall of the opening portion 831 in a watertight manner, and the opening portion 831 is sealed by the seal portion 310. The main body portion 311, the flange portion 320, the boss 330, and the abutment rib 340 are integrally formed, for example.

The main body portion 311 includes a flat surface 311*a* and a flat surface 311*b* that are parallel to each other. The seal member 3 is disposed in the placing recessed portion 420 such that the flat surface 311*a* of the main body portion 311 is positioned on the placing recessed portion 420 side of the shield cover 4. The main body portion 311 includes a thinned portion 360 that is open in the flat surface 311*a*.

The flange portion 320 extends outward from an end portion on the flat surface 311*a* side of the peripheral side surface of the main body portion 311 so as to surround the end portion. The flange portion 320 has a circular shape (specifically, exact circular shape) in accordance with the shape of the main body portion 311 in planar view.

The abutment rib 340 is provided upright on the flat surface 311*a* of the main body portion 311. The abutment rib 340 extends in a circle (specifically, an exact circle) along the edge of the circular flat surface 311*a*, for example. In a state where the seal member 3 is disposed in the placing recessed portion 420, the abutment rib 340 abuts on the inner bottom surface of the placing recessed portion 420.

The boss 330 to which the screw 7 is attached is provided on the main body portion 311, for example. The boss 330 is positioned at a central portion of the main body portion 311. The boss 330 has a hollow columnar shape, for example. The boss 330 extends from the flat surface 311*b* side to the flat surface 311*a* side along the thickness direction of the main body portion 311. There is the thinned portion 360 around the boss 330. A lower hole 332 is provided in the boss 330. The lower hole 332 is open in a leading end surface 331 of the boss 330. An outer bottom surface 333 of the boss 330 is closed, and protrudes outward of the flat surface 311*b* of the main body portion 311. When the seal member 3 is disposed in the placing recessed portion 420 of the shield cover 4, the boss 330 is inserted into the through hole 421 of the placing recessed portion 420 from the main surface 430*a* side. In a state where the boss 330 is inserted into the through hole 421, the leading end surface 331 of the boss 330 is positioned outside the shield cover 4. That is to say, the leading end surface 331 is positioned outward of the outer surface (in other words, the surface on the main surface 430*b* side) of the placing recessed portion 420.

The screw 7 is a tap screw that includes a washer head, for example. A screw portion 7*b* of the screw 7 is inserted into the lower hole 332 of the boss 330 inserted into a through hole 412 of the shield cover 4, from the main surface 430*b* side, and is screwed into the boss 330. At this time, a washer 7*a* of the screw 7 abuts on the leading end surface 331 of the boss 330 that protrudes to the outside of the shield cover 4, and does not come into contact with the shield cover 4. Moreover, the diameter of the washer 7*a* is larger than the diameter of the through hole 421, and thus the screw 7 attached to the boss 330 is unlikely to come loose through the through hole 421 to the main surface 430*a* side. Accordingly, the seal member 3 is attached to the shield cover 4. The screw 7 is screwed into the center of the seal member 3, and is attached to the center.

In this example, the outer bottom surface 333 of the boss 330 protrudes outward of the flat surface 311*b* of the main body portion 311, and thus it is possible to increase the thickness of the bottom portion of the boss 330. Accordingly, even if the screw 7 is excessively screwed into the boss 330, the leading end of the screw 7 is unlikely to protrude from the outer bottom surface 333 of the boss 330.

Example of Rotation Stop Structure of Second Seal Member

In this example, the outer shape of the seal member 3 in planar view as viewed from a direction perpendicular to the specific plane is circular. For this reason, when the screw 7 is screwed into the boss 330 of the seal member 3, there is the possibility that the seal member 3 will co-rotate with the screw 7.

In view of this, the interlock connector-equipped cover 1 includes the rotation stop structure of the seal member 3. The rotation stop structure is constituted by the above-described rotation stop hole 422 provided in the shield cover 4, and the rotation stop protrusion portion 10 that is inserted into the rotation stop hole 422, for example. The rotation stop protrusion portion 10 protrudes outward from the flange portion 320 of the seal member 3 and the outer circumferential wall of the abutment rib 340 along the radial direction of the circular flat surface 311*a*, for example. The rotation stop protrusion portion 10 is integrally formed with the flange portion 320 and the abutment rib 340, for example. When the seal member 3 is disposed in the placing recessed portion 420 of the shield cover 4, the rotation stop protrusion portion 10 is inserted into the rotation stop hole 422 provided on a side surface portion of the placing recessed portion 420. Accordingly, when the seal member 3 is about to co-rotate along with the screw 7, the rotation stop protrusion portion 10 hits the inner peripheral wall of the rotation stop hole 422, and the seal member 3 is unlikely to co-rotate.

<Floating of Seal Member>

The first seal member 2 in a state of being attached to the shield cover 4 is in a floating state in which the first seal member 2 is movable relative to the shield cover 4. Similarly, the second seal member 3 in a state of being attached to the shield cover 4 is in a floating state in which the second seal member 3 is movable relative to the shield cover 4.

Figure 7:
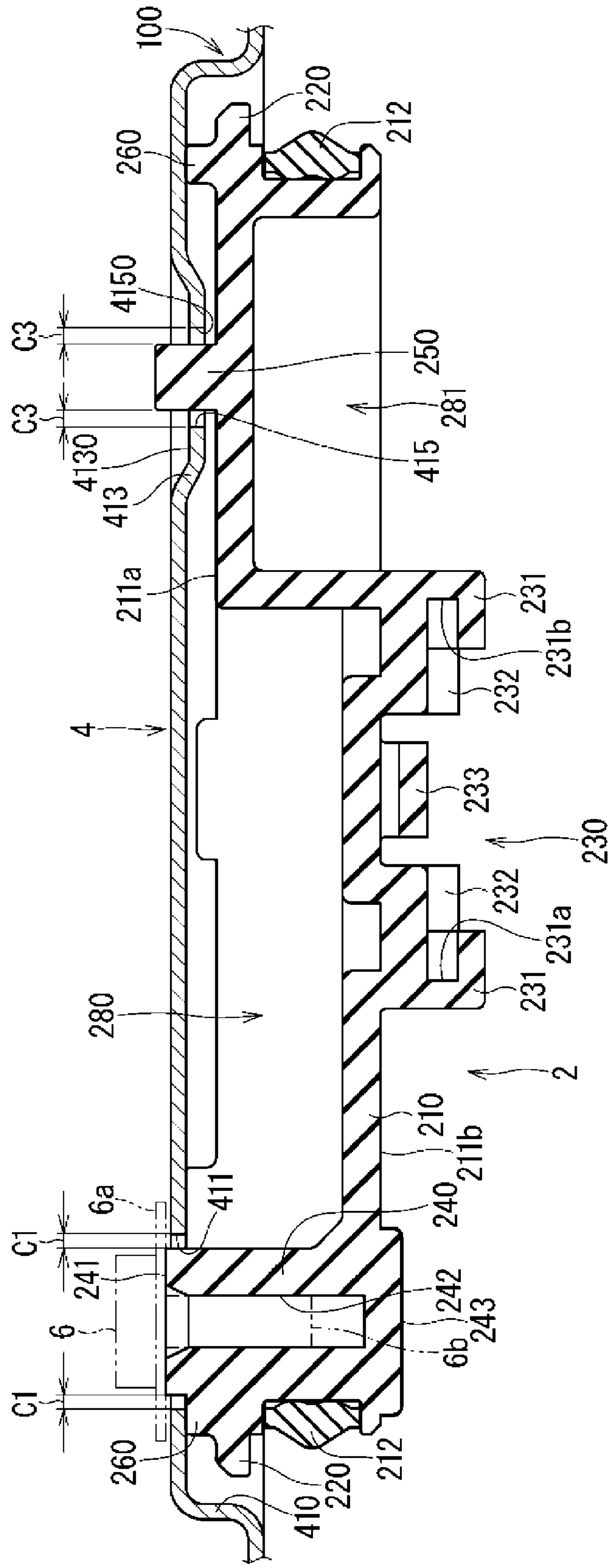
FIG. 7 is a schematic diagram showing an example of a cross-sectional structure of a shield cover and a first seal member.
Figure 8:
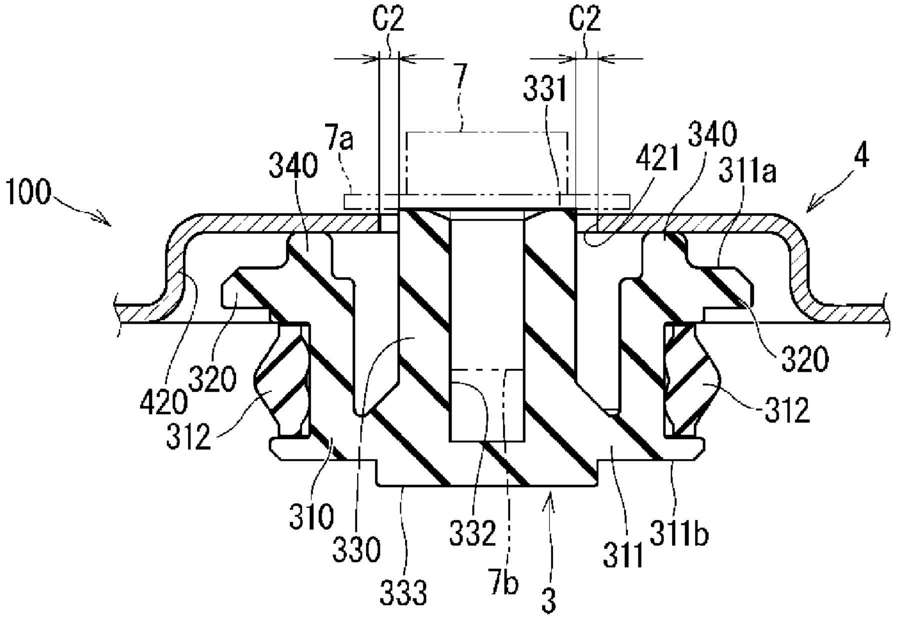
FIG. 8 is a schematic diagram showing an example of a cross-sectional structure of the shield cover and a second seal member.

FIG. 7 is a schematic diagram showing an example of a cross-sectional structure of the shield cover 4 and the first seal member 2. In FIG. 7, the screw 6 attached to the first seal member 2 is indicated by the dashed double-dotted line. FIG. 8 is a schematic diagram showing an example of a cross-sectional structure of the shield cover 4 and the second seal member 3. In FIG. 8, the screw 7 attached to the second seal member 3 is indicated by the dashed double-dotted line.

As shown in FIG. 7, there is a first clearance C1 (also simply referred to as a "clearance C1") in the through hole 411 provided in the bottom portion of the placing recessed portion 410 of the shield cover 4, that is to say, the through hole 411 into which the screw 6 is inserted. In this example, there is the clearance C1 between the inner circumferential wall of the through hole 411 and the outer circumferential wall of the boss 240 inserted into the through hole 411.

In addition, as shown in FIG. 8, there is a second clearance C2 (also simply referred to as a "clearance C2") in the through hole 421 provided in the bottom portion of the placing recessed portion 420 of the shield cover 4, that is to say, the through hole 421 into which the screw 7 is inserted. In this example, there is the clearance C2 between the inner circumferential wall of the through hole 421 and the outer circumferential wall of the boss 330 inserted into the through hole 421.

In addition, as shown in FIG. 7, there is a third clearance C3 (also simply referred to as a "clearance C3") in the through hole 415 provided in the bottom portion of the placing recessed portion 410 of the shield cover 4, that is to say, the through hole 415 into which the regulating protrusion portion 250 of the seal member 2 is inserted. The regulating protrusion portion 250 passes through the shield cover 4 in a state where there is the third clearance C3. The clearance C3 is between the inner circumferential wall of the through hole 415 and the outer circumferential wall of the regulating protrusion portion 250.

The seal member 2 is movable relative to the shield cover 4 along the specific plane (that is to say, a plane that intersects the fitting direction D1 of the connector 5) in accordance with the clearance C1. In other words, the seal member 2 is movable relative to the shield cover 4 along the main surface 430*a* and the main surface 430*b* of the base portion 430 of the shield cover 4 in accordance with the clearance C1.

The seal member 2 is movable in all directions centered on the central axis of the through hole 411 along the specific plane, for example. The seal member 2 can move along the longitudinal direction of the shield cover 4, for example. In addition, the seal member 2 can move along a direction that is perpendicular to the longitudinal direction of the shield cover 4 and that extends along a direction that extends along the specific plane. In addition, the seal member 2 can move in another direction that extends along the specific plane.

In addition, the seal member 2 can rotate relative to the shield cover 4 along the specific plane, using the boss 240 as a support point, and move relative to the shield cover 4. In other words, the seal member 2 can rotate relative to the shield cover 4 along the specific plane using the screw 6 as a support point, and move relative to the shield cover 4. The seal member 2 moving relative to the shield cover 4 along the specific plane also includes the seal member 2 rotating relative to the shield cover 4 along the specific plane using the boss 240 and the screw 6 as support points. The seal member 2 can rotate both clockwise and counter-clockwise using the screw 6 as a support point, for example.

The regulating protrusion portion 250 can regulate rotation of the seal member 2 in accordance with the clearance C3, by being inserted into the through hole 415 of the shield cover 4. When the seal member 2 rotates relative to the shield cover 4 along the specific plane using the screw 6 as a support point, the regulating protrusion portion 250 hits the inner circumferential wall of the through hole 415, and rotation of the seal member 2 is regulated. The maximum rotation amount of the seal member 2 depends on the clearance C3. In this example, the clearance C3 is set to be larger than the clearance C1. For this reason, the maximum amount of movement of the entire seal member 2 from the central axis of the through hole 411 along the specific plane depends on the clearance C1.

In this manner, the seal member 2 is movable relative to the shield cover 4 along the specific plane in this example. Here, a manufacturing error, an attachment error, or the like may occur at the position where the opening portion 821 into which the seal portion 210 of the seal member 2 is fitted is disposed. In addition, a manufacturing error, an attachment error, or the like may also occur at the position of the seal member 2 relative to the shield cover 4. Since the seal member 2 is movable relative to the shield cover 4 along the specific plane, such an error can be absorbed, and the seal portion 210 can be easily fitted into the opening portion 821. Thus, ease of an operation of fitting the seal portion 210 into the opening portion 821 improves.

In this example, one end portion in the longitudinal direction of the seal member 2 is attached to the shield cover 4 using the screw 6. In contrast, the regulating protrusion portion 250 merely passes through the shield cover 4, and the other end portion in the longitudinal direction of the seal member 2 is not attached to the shield cover 4. In such a case, when only the shield cover 4 out of the shield cover 4 and the seal member 2 is held, or the like, the seal member 2 may be inclined using the one end portion thereof as a support point, such that the other end portion separates from the shield cover 4. That is to say, the seal member 2 may be inclined relative to the shield cover 4 using the screw 6 as a support point. At this time, if the amount of protrusion of the regulating protrusion portion 250 from the shield cover 4 is small, there is the possibility that the regulating protrusion portion 250 will come loose from the through hole 415 and be detached from the shield cover 4.

In this example, the regulating protrusion portion 250 protrudes from the opening 4150 provided in the recessed surface 4130 of the surface of the shield cover 4 (that is to say, the opening on the main surface 430*b* side of the through hole 415) to the outside of the shield cover 4. Accordingly, it is possible to increase the amount of protrusion of the regulating protrusion portion 250 from the shield cover 4. As a result, even when the seal member 2 is inclined relative to the shield cover 4 using the screw 6 as a support point, the regulating protrusion portion 250 is unlikely to be detached from the shield cover 4.

Figure 9:
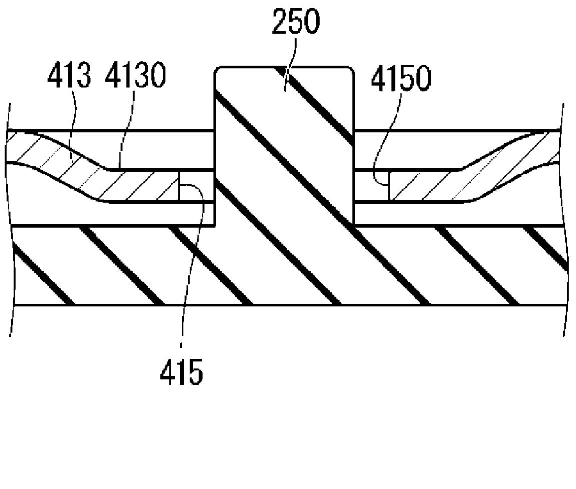
FIG. 9 is a schematic diagram showing an example of a cross-sectional structure of the second seal member.

Note that the periphery of the opening 4150 may surround the base side (in other words, the base end side or the main body portion 211 side) of the regulating protrusion portion 250 relative to the center in the protrusion direction of the regulating protrusion portion 250, as shown in FIG. 9, for example. When a portion on the leading end side of the regulating protrusion portion 250 hits the inner circumferential wall of the through hole 415 of the shield cover 4, there is the possibility that the regulating protrusion portion 250 will be broken. By the opening 4150 surrounding the base side of the regulating protrusion portion 250 relative to the center in the protrusion direction of the regulating protrusion portion 250 as in the example in FIG. 9, the base side of the regulating protrusion portion 250 hits the shield cover 4. Accordingly, the regulating protrusion portion 250 is less likely to be broken.

The seal member 3 is movable relative to the shield cover 4 along the specific plane in accordance with the clearance C2 independently from the seal member 2. Similarly to the seal member 2, the seal member 3 is movable in all directions centered on central axis of the through hole 421 along the specific plane, for example. The seal member 3 can move along the longitudinal direction of the shield cover 4, for example. In addition, the seal member 3 can move along a direction that is perpendicular to the longitudinal direction of the shield cover 4, and that extends along the specific plane. In addition, the seal member 3 can move along another direction that extends along the specific plane. In this example, in a state where the rotation stop protrusion portion 10 is inserted into the rotation stop hole 42, there is a clearance between the inner peripheral wall of the rotation stop hole 422 and the rotation stop protrusion portion 10. For this reason, the seal member 3 is movable in all directions centered on the central axis of the through hole 421 along the specific plane.

In addition, in a state of being attached to the shield cover 4 using the screw 7, the seal member 3 can rotate about the boss 330 and the screw 7 along the specific plane relative to the shield cover 4. Such rotation of the seal member 3 is regulated by the rotation stop structure. When the seal member 3 rotates in a state where the seal member 3 is attached to the shield cover 4, the rotation stop protrusion portion 10 extending from the seal member 3 hits the inner peripheral wall of the rotation stop hole 42, and rotation of the seal member 3 is regulated.

In this manner, in this example, the seal member 3 is movable relative to the shield cover 4 along the specific plane. Similarly to the opening portion 821, a manufacturing error, an attachments error, or the like may occur at the position where the opening portion 831 into which the seal portion 310 of the seal member 3 is fitted is disposed. In addition, a manufacturing error, an attachments error, or the like may also occur at the position of the seal member 3 relative to the shield cover 4. Since the seal member 3 is movable relative to the shield cover 4 along the specific plane, such an error can be absorbed. Thus, the seal portion 310 is likely to be fitted into the opening portion 831. As a result, ease of an operation of fitting the seal portion 310 into the opening portion 831 improves.

Configuration Example of Connector Holding Portion and Interlock Connector

Figure 10:
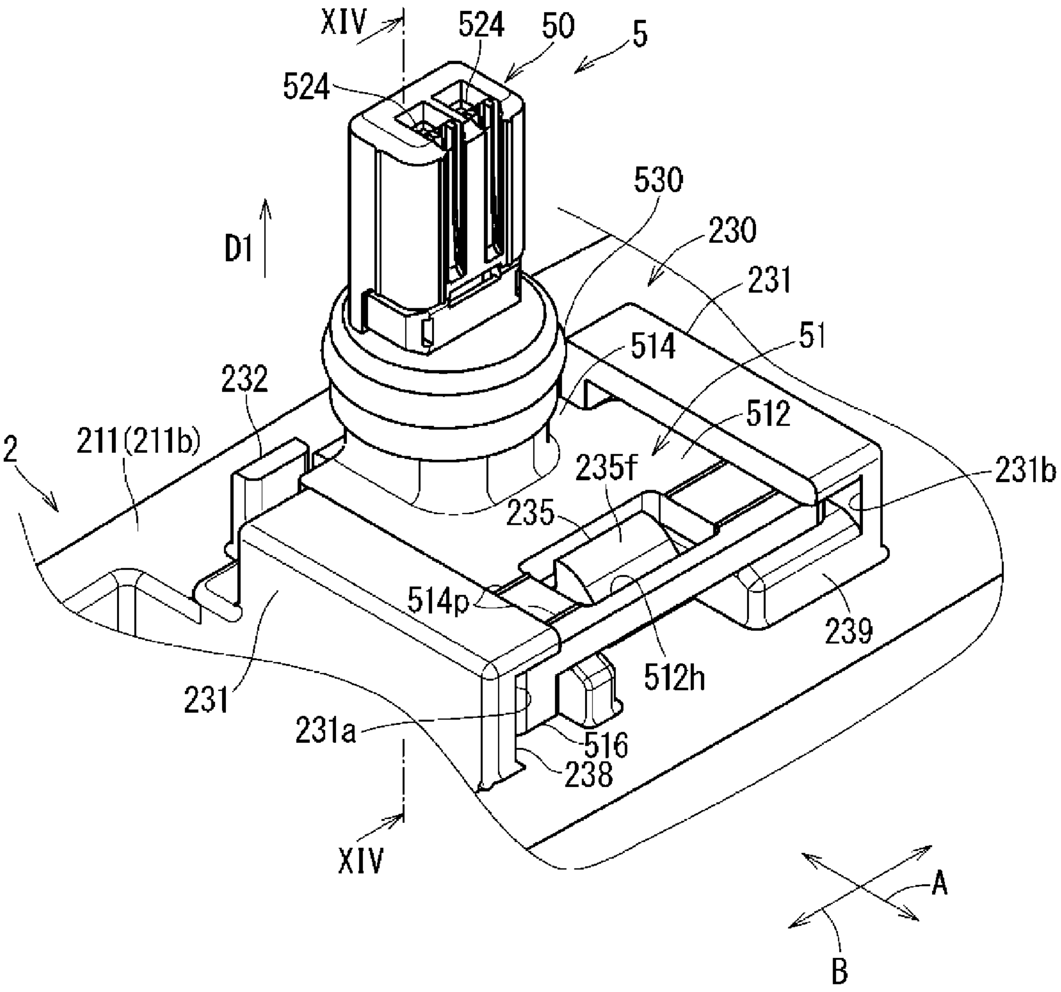
FIG. 10 is a perspective view showing a state where the interlock connector is held on a connector holding portion.
Figure 11:
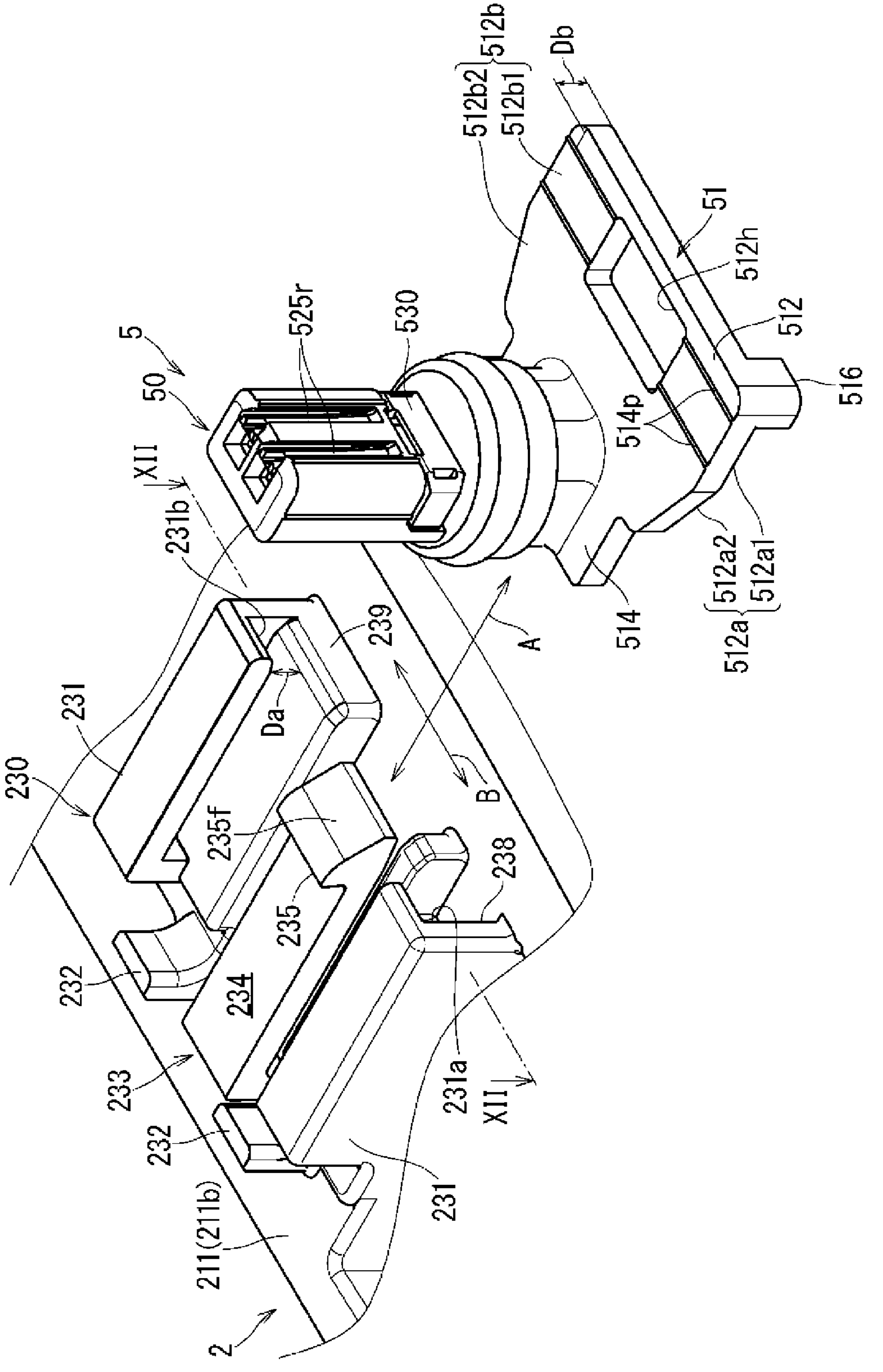
FIG. 11 is a perspective view showing a state before the interlock connector is attached to the connector holding portion.
Figure 12:
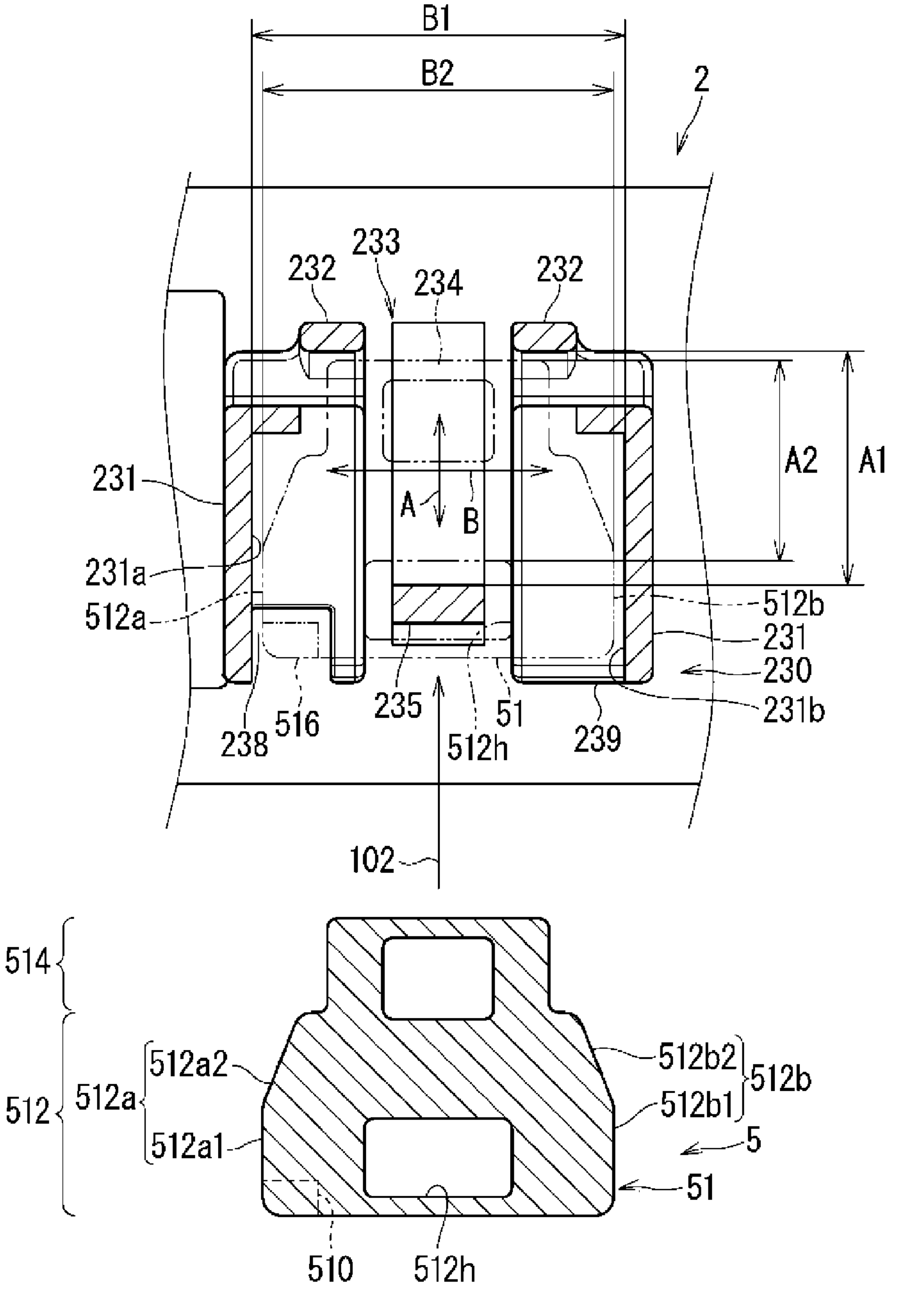
FIG. 12 is a cross-sectional view taken along the line XII-XII in FIG. 11.

FIG. 10 is a perspective view showing a state where the interlock connector 5 is held on the connector holding portion 230. FIG. 11 is a perspective view showing a state before the interlock connector 5 is attached to the connector holding portion 230. FIG. 12 is a cross-sectional view taken along the line XII-XII in FIG. 11. In FIG. 12, an attachment portion 51 in a state where the connector 5 is held on the holding portion 230 is indicated by a dash-double-dot line.

The connector 5 includes a fitting portion 50 that is to be mated with the connector 880, and the attachment portion 51 that is held on the holding portion 230. The fitting portion 50 is formed in an elongated shape extending along the fitting direction D1, and extends from the seal member 2 toward the partner connector 880 in the attachment target 800 in a state where the interlock connector 5 is held on the seal member 2 via the holding portion 230. The attachment portion 51 is formed in a plate shape extending from the base end of the fitting portion 50 along the virtual floating plane that intersects the fitting direction D1 of the fitting portion 50 (in the present embodiment, the virtual floating plane is perpendicular to the fitting direction D1). The attachment portion 51 is slidably inserted into the holding portion 230, and is held on the holding portion 230. The connector 5 is attached at a position closer to the center of the seal member 2 than the screw 6 in the alignment direction of the seal members 2 and 3 (in other words, the longitudinal direction of the main body portion 211).

As shown in FIG. 11, the attachment portion 51 includes a first side portion **512*a* and a second side portion 512*b*. The first side portion 512*a* and the second side portion 512*b* are positioned on the opposite side to each other. By the attachment portion 51 protruding in a plate shape from the base end portion of the fitting portion 50 in at least three directions, it is possible to provide a portion for forming a configuration related to the first side portion 512*a* and the second side portion 512*b*, and a configuration for holding the interlock connector 5 while preventing coming-off using a coming-off preventing elastic piece 233 (for example, a coming-off preventing recessed portion 512*h***).

In the present embodiment, the attachment portion 51 is formed in a plate shape in which a wide portion 512 and a narrow portion 514 are continuous. Here, a direction, on the virtual floating plane, in which the attachment portion 51 is slidably inserted into the holding portion 230 in a state where the connector 5 is held on the holding portion 230 is referred to as a "first direction A," and a direction perpendicular to the first direction is referred to as a "second direction B." The wide portion 512 and the narrow portion 514 are continuous in the first direction A. The wide portion 512 is wider than the narrow portion 514 in the second direction B.

Portions of the two end sides in the second direction B of the wide portion 512 are the above first side portion **512*a* and second side portion 512*b*. The first side portion 512*a* and the second side portion 512*b* include portions that extend in parallel along the first direction A. In the present embodiment, the portions of the first side portion 512*a* and the second side portion 512*b* that are on the far side from the narrow portion 514 are parallel portions 512*a*1 and 512*b*1** that extend in parallel to each other along the first direction A.

Portions on one side in the first direction A of the first side portion **512*a* and the second side portion 512*b* (the leading side when the attachment portion 51 is inserted into the holding portion 230, which is, in the present embodiment, the narrow portion 514 side) are formed into attachment guide surfaces 512*a*2 and 512*b*2 whose widths gradually decrease from the other side in the first direction A toward the one side. Note that the attachment guide surfaces 512*a*2 and 512*b*2** are not essential.

The coming-off preventing recessed portion **512*h* is formed in the attachment portion 51. In the present embodiment, the coming-off preventing recessed portion 512*h* is formed in an intermediate portion in the second direction B of the narrow portion 514. The coming-off preventing recessed portion 512*h* passes through the two surfaces of the attachment portion 51, and a coming-off preventing protrusion portion 235 can engage with the coming-off preventing recessed portion 512*h* while preventing coming-off. The coming-off preventing recessed portion 512*h* does not need to pass through the attachment portion 51, and it suffices for the coming-off preventing recessed portion 512*h* to be recessed as viewed from the seal member 2** side.

Protruded rim portions **514*p* are formed on the attachment portion 51. In the present embodiment, the protruded rim portions 514*p* are formed on one main surface of the narrow portion 514 along the second direction B. A plurality of (here, two) protruded rim portions 514*p* are formed, for example. The protruded rim portions 514*p* are positioned closer to the parallel portions 512*a*1 and 512*b*1 than the later-described attachment guide surfaces 512*a*2 and 512*b*2 in the first direction A. The protruded rim portions 514*p* have a role of increasing the thickness of a portion of the attachment portion 51. In a state where, for example, the thickness of a portion of the attachment portion 51 that is first inserted into a first guide groove 231*a* and a second guide groove 231*b* is small, and the attachment portion 51 is fully inserted into the first guide groove 231*a* and the second guide groove 231*b*, portions of the attachment portion on which the protruded rim portions 514*p* are formed are inserted into the first guide groove 231*a* and the second guide groove 231*b*. Accordingly, it is possible to reduce the degree of freedom of the attachment portion 51 in the fitting direction D1 at the last stage for inserting the attachment portion 51, so as to make the interlock connector 5 less likely to move significantly in the fitting direction D1, while making it easy to insert the attachment portion 51 into the first guide groove 231***a* and the second guide groove 231*b*.

The narrow portion 514 is continuous to the wide portion 512 on one side in the first direction A. The surface of the narrow portion 514 that is on the opposite side to the wide portion 512 is a flat surface extending in a direction perpendicular to the first direction A.

The attachment portion 51 includes an erroneous mounting preventing protrusion portion 516 that protrudes from the first side portion 512*a* in a direction that intersects the first side portion 512*a*. In the present embodiment, the erroneous mounting preventing protrusion portion 516 is perpendicular to both the first direction A and the second direction B, and protrudes on the opposite side to the fitting portion 50. The erroneous mounting preventing protrusion portion 516 is a protrusion portion that partially protrudes from a corner portion on the other side in the first direction A of the first side portion 512*a*. The surfaces of the erroneous mounting preventing protrusion portion 516 that are on the first side portion 512*a* side and on the opposite side to the narrow portion 514 are positioned as extensions of the outer peripheral surface of the attachment portion 51. The surfaces of the erroneous mounting preventing protrusion portion 516 that are on the second side portion 512*b* side and the narrow portion 514 side extend in directions perpendicular to the surface of the attachment portion 51 that is on the opposite side to the fitting portion 50.

The connector holding portion 230 is provided on the flat surface 211*b* of the main body portion 211, for example. The holding portion 230 is positioned on a central portion in the longitudinal direction of the flat surface 211*b*, for example. The holding portion 230 includes a pair of slidably supporting portions 231, a pair of farther-side receiving portions 232, and the coming-off preventing elastic piece 233, for example. The first guide groove 231*a* and the second guide groove 231*b* are formed in inner portions of the pair of slidably supporting portions 231 that oppose each other. The first guide groove 231*a* and the second guide groove 231*b* extend along the first direction A extending along the virtual floating plane. Along the first direction A, the first guide groove 231*a* guides the first side portion 512*a* and the second guide groove 231*b* guides the second side portion 512*b*. The first guide groove 231*a* and the second guide groove 231*b* are closed on one side along the first direction A (on the farther side in the insertion direction), and are open on the other side (on the front side in the insertion direction). The first guide groove 231*a* and the second guide groove 231*b* may be open in both the two sides in the direction in which the first guide groove 231*a* and the second guide groove 231*b* extend.

The farther-side receiving portions 232 regulate the position of the attachment portion 51 on one side along the first direction A. In the present embodiment, the farther-side receiving portions 232 are positioned between a pair of extended lines of the bottom surfaces of the first guide groove 231*a* and the second guide groove 231*b* that are extended in the direction in which the attachment portion 51 is inserted into the holding portion 230. In the present embodiment, the two farther-side receiving portions 232 are each formed at a position displaced from the center of the first guide groove 231*a* or the second guide groove 231*b* toward one side of the first guide groove 231*a* or the second guide groove 231*b*. The farther-side receiving portions 232 protrude from the seal member 2 in the fitting direction D1, and are formed in a plate shape that is flat in a direction perpendicular to the first direction A, for example. Moreover, when the attachment portion 51 is inserted into the holding portion 230, the surface of the narrow portion 514 of the attachment portion 51 that is on the opposite side to the wide portion 512 comes into contact with the farther-side receiving portions 232. Accordingly, movement of the attachment portion 51 to the farther-side receiving portion 232 side along the first direction A is regulated.

Note that a configuration may also be adopted in which the above farther-side receiving portions 232 are omitted, and, instead, portions of the first guide groove 231*a* and the second guide groove 231*b* that are on the farther side in the insertion direction of the first side portion 512*a* and the second side portion 512*b* may be used as farther-side receiving portions. Understandably, by separately providing the farther-side receiving portions 232 rather than such portions on the farther side of the first guide groove 231*a* and the second guide groove 231*b*, it is possible to fix the regulation position on the farther side of the attachment portion 51 irrespective of the shapes of the first side portion 512*a* and the second side portion 512*b*. Even when the attachment guide surfaces 512*a*2 and 512*b*2 that are inclined are provided on the first side portion 512*a* and the second side portion 512*b*, for example, the regulation positions can be fixed using a flat surface on the farther side of the attachment portion 51 without being affected by the inclined shapes.

The coming-off preventing elastic piece 233 includes the coming-off preventing protrusion portion 235, and restricts coming-off of the attachment portion 51 on the other side along the first direction A. In the present embodiment, the coming-off preventing elastic piece 233 includes an elastic piece 234 and the coming-off preventing protrusion portion 235. The base end of the elastic piece 234 is fixed at a certain position by the seal member 2. The coming-off preventing protrusion portion 235 protrudes from a leading end of the elastic piece 234. The coming-off preventing protrusion portion 235 is positioned away from the farther-side receiving portions 232 along the first direction. The elastic piece 234 supports the coming-off preventing protrusion portion 235 such that the coming-off preventing protrusion portion 235 can recede and move in a direction that intersects the first direction A. More specifically, one end of the elastic piece 234 is fixed at a certain position to the seal member 2, between the pair of guide grooves 231*a* and 231*b*, in the present embodiment, between the pair of farther-side receiving portions 232. A portion on the base end side of the elastic piece 234 protrudes from the seal member 2 toward the fitting direction D1, and is then formed in an L-shape that is bent along the first direction A. A portion of the elastic piece 234 that is between an intermediate position to a position close to the leading end extends along the first direction A, at a position spaced away from the seal member 2. The coming-off preventing protrusion portion 235 is formed at a leading end of the elastic piece 234 so as to protrude toward the fitting direction D1. A portion of the coming-off preventing protrusion portion 235 that is on the base end side of the elastic piece 234 is formed as a surface that is perpendicular to the first direction A and is oriented to the base end side of the elastic piece 234. A portion of the coming-off preventing protrusion portion 235 that is on the leading end side of the elastic piece 234 is formed as an inclined surface 235*f* due to which the protrusion length of the coming-off preventing protrusion portion 235 gradually decreases toward the leading end side of the elastic piece 234. The elastic piece 234 supports the coming-off preventing protrusion portion 235 at a position opposing the farther-side receiving portions 232 with a space therebetween along the first direction A, such that the coming-off preventing protrusion portion 235 can recede and move in a direction that intersects the first direction (here, a direction that extends along the fitting direction D1).

The connector holding portion 230 includes an erroneous mounting preventing recessed portion 238. The erroneous mounting preventing recessed portion 238 is formed so as to be continuous to the first guide groove 231*a*, at a position displaced relative to the first guide groove 231*a* in a direction that intersects the first direction A. In other words, as viewed along the first direction A, the first guide groove 231*a* and the erroneous mounting preventing protrusion portion 516 are formed at different positions, and space in the first guide groove 231*a* and space in the erroneous mounting preventing recessed portion 238 are continuous to each other. In the present embodiment, the erroneous mounting preventing recessed portion 238 is formed as a recessed portion that is partially recessed from the opening of the first guide groove 231*a* that is on a side where the first side portion 512*a* is received, toward the seal member 2 side along the fitting direction D1. That is to say, as viewed along the first direction A, the position of the erroneous mounting preventing recessed portion 238 relative to the first guide groove 231*a* is the same as the position of the erroneous mounting preventing protrusion portion 516 relative to the first side portion 512*a*. As viewed along the first direction A, the erroneous mounting preventing recessed portion 238 is open wider than the erroneous mounting preventing protrusion portion 516. In the present embodiment, the depth in the first direction A of the erroneous mounting preventing recessed portion 238 is larger than or equal to the length in the first direction A of the erroneous mounting preventing protrusion portion 516. For this reason, the entire erroneous mounting preventing protrusion portion 516 can be accommodated in the erroneous mounting preventing recessed portion 238.

When a portion corresponding to the erroneous mounting preventing recessed portion 238 is observed with reference to the correspondence plane between the first guide groove 231*a* and the second guide groove 231*b* of the holding portion 230, there is no recessed portion in such a portion, and there is a solid portion. When the attachment portion 51 is attached in a wrong orientation, the portion corresponding to the erroneous mounting preventing recessed portion 238 can take on a role as an interference portion 239 that may interfere with the erroneous mounting preventing protrusion portion 516.

Operations when the attachment portion 51 is held on the holding portion 230 will be described. The first side portion 512*a* and the second side portion 512*b* of the attachment portion 51 are slidably inserted into the first guide groove 231*a* and the second guide groove 231*b*, respectively. At this time, portions on one side in the first direction A of the first side portion 512*a* and the second side portion 512*b* are formed as the above attachment guide surfaces 512*a*2 and 512*b*2. For this reason, the first side portion 512*a* and the second side portion 512*b* are smoothly inserted into the first guide groove 231*a* and the second guide groove 231*b*. In addition, no elongated protrusion portion 514*p* is formed on portions of the attachment portion 51 into which the first guide groove 231*a* and the second guide groove 231*b* are inserted at an initial stage, and thus, also in this regard, the attachment portion 51 can be smoothly inserted into the first guide groove 231*a* and the second guide groove 231*b*.

When the first side portion 512*a* and the second side portion 512*b* of the attachment portion 51 are slidably inserted into the first guide groove 231*a* and the second guide groove 231*b*, the inclined surface 235*f* of the coming-off preventing protrusion portion 235 comes into contact with a leading portion in the insertion direction of the attachment portion 51. Accordingly, the elastic piece 234 elastically deforms to the seal member 2 side such that the coming-off preventing protrusion portion 235 avoids a moving locus of the attachment portion 51.

When the attachment portion 51 is inserted into the holding portion 230 all the way, and the coming-off preventing protrusion portion 235 is disposed at a position corresponding to the coming-off preventing recessed portion 512*h*, the elastic piece 234 returns to the original shape thereof due to an elastic force, and the coming-off preventing protrusion portion 235 is disposed in the coming-off preventing recessed portion 512*h*. In this state, the coming-off preventing protrusion portion 235 is surrounded by the coming-off preventing recessed portion 512*h*, and is not exposed to the outer periphery of the attachment portion 51. Accordingly, a force for inadvertently displacing the coming-off preventing protrusion portion 235 is unlikely to act, and the attachment portion 51 is unlikely to be unintentionally detached from the holding portion 230. In addition, the parallel portions 512*a*1 and 512*b*1 of the first side portion 512*a* and the second side portion 512*b* are respectively disposed in the first guide groove 231*a* and the second guide groove 231*b*.

Note that, when the attachment portion 51 is inserted into the holding portion 230 at proper orientation, that is to say, when the first side portion 512*a* is inserted into the first guide groove 231*a* and the second side portion 512*b* is inserted into the second guide groove 231*b*, the erroneous mounting preventing protrusion portion 516 is received by the erroneous mounting preventing recessed portion 238. For this reason, the attachment portion 51 can be inserted into the holding portion 230 all the way.

Assume that, in contrast, when the attachment portion 51 is inserted into the holding portion 230 at wrong orientation, for example, the first side portion 512*a* is inserted into the second guide groove 231*b*, and the second side portion 512*b* is inserted into the first guide groove 231*a*. In this case, the erroneous mounting preventing protrusion portion 516 comes into contact with a peripheral portion of the second guide groove 231*b*, for example, the above interference portion 239. Accordingly, the attachment portion 51 cannot be inserted into the first guide groove 231*a* and the second guide groove 231*b*. Accordingly, erroneous mounting of the attachment portion 51 to the holding portion 230 is suppressed.

In a state where the attachment portion 51 is properly held on the holding portion 230 (see the attachment portion 51 indicated by the dash-double-dot line in FIG. 12), the first side portion 512*a* and the second side portion 512*b* are respectively guided by the first guide groove 231*a* and the second guide groove 231*b*, and the attachment portion 51 is held on the connector holding portion 230. In this state, in the first direction A, the attachment portion 51 is movable within a range restricted between the farther-side receiving portions 232 and the coming-off preventing protrusion portion 235. More specifically, the distance between the opposing surfaces of the coming-off preventing protrusion portion 235 and the farther-side receiving portions 232 is denoted by A1. The distance between the surface of the attachment portion 51 that opposes the farther-side receiving portions 232 and the inner periphery surface of the attachment portion 51 that surrounds the coming-off preventing recessed portion 512*h* and that opposes the coming-off preventing protrusion portion 235 from the opposite side to the farther-side receiving portions 232 is denoted by A2. The attachment portion 51 is movable within an (A1-A2) regulation range in the first direction A.

In addition, in the second direction B, the attachment portion 51 is movable within a range in which movement of the parallel portions 512*a*1 and 512*b*1 of the first side portion 512*a* and the second side portion 512*b* is regulated between the opposing bottom surfaces of the first guide groove 231*a* and the second guide groove 231*b*. More specifically, the distance between the parallel portions 512*a*1 and 512*b*1 of the first side portion 512*a* and the second side portion 512*b* is denoted by B2. The distance between the opposing bottom surfaces of the first guide groove 231*a* and the second guide groove 231*b* is demoted by B1. The attachment portion 51 is movable within a (B1-B2) regulation range in the second direction B.

Note that, in the fitting direction D1, the attachment portion 51 is movable within a range in which movement of each of the first side portion 512*a* and the second side portion 512*b* is regulated between the two side surfaces of the first guide groove 231*a* or the second guide groove 231*b* that oppose each other in the fitting direction D1. More specifically, the distance between the two side surfaces of each of the first guide groove 231*a* and the second guide groove 231*b* that oppose each other in the fitting direction D1 is denoted by Da. The maximum length in the fitting direction D1 of each of the first side portion 512*a* and the second side portion 512*b* is demoted by Db. In the present embodiment, the protruded rim portions 514*p* are formed on the first side portion 512*a* and the second side portion 512*b*. For this reason, the maximum size Db is a value obtained by adding the protrusion length of the protruded rim portions 514*p* to the thickness of the attachment portion 51. The attachment portion 51 is movable within a (Da-Db) regulation range in the fitting direction D1. The amount (Da-Db) by which the attachment portion 51 can move in the fitting direction D1 may be 0, but may also be larger than 0. By setting the amount (Da-Db) by which the attachment portion 51 can move in the fitting direction D1, to a value larger than 0, the attachment portion 51 also easily moves on the virtual floating plane.

Also in this case, it is preferred that the amount (A1-A2) by which the attachment portion 51 is movable in the first direction A and the amount (B1-B2) by which the attachment portion 51 is movable in the second direction B are larger than the amount (Da-Db) by which the first side portion 512*a* and the second side portion 512*b* are respectively movable in the first guide groove 231*a* and the second guide groove 231*b* in the fitting direction D1. Accordingly, while enabling the interlock connector 5 to move on the virtual floating plane, it is possible to regulate movement of the interlock connector 5 in the fitting direction D1, and thereby to suppress excessive rattling and excessive inclination in the fitting direction D1 of the interlock connector 5.

In this attachment state, the erroneous mounting preventing protrusion portion 516 is positioned in the erroneous mounting preventing recessed portion 238. Setting is performed such that, in this state, before or at the same time as the erroneous mounting preventing protrusion portion 516 coming into contact, in the second direction B, with the surface of the erroneous mounting preventing recessed portion 238, the first side portion 512*a* comes into contact with the bottom surface of the first guide groove 231*a*, or the second side portion 512*b* comes into contact with bottom surface of the second guide groove 231*b*. In other words, setting is performed such that only the erroneous mounting preventing protrusion portion 516 is prevented from coming into contact with the surface of the erroneous mounting preventing recessed portion 238 before the first side portion 512*a* comes into contact with the bottom surface of the first guide groove 231*a*, or the second side portion 512*b* comes into contact with the bottom surface of the second guide groove 231*b*.

In the present embodiment, the surface of the erroneous mounting preventing protrusion portion 516 that is on the bottom surface side of the first guide groove 231*a* extends on extension of the surface of the plate-shaped attachment portion 51 that is on the bottom surface side of the first guide groove 231*a*. The surface on the outer side in the second direction B of the erroneous mounting preventing recessed portion 238 extends on extension of the bottom surface of the first guide groove 231*a*. For this reason, when the attachment portion 51 moves to the first guide groove 231*a* side in the second direction, the attachment portion 51 comes into contact with the bottom surface of the first guide groove 231*a* at the same time as the erroneous mounting preventing protrusion portion 516 coming into contact with a surface of the erroneous mounting preventing recessed portion 238. For this reason, a force for moving the attachment portion 51 to the first guide groove 231*a* side is kept from acting on the erroneous mounting preventing protrusion portion 516 independently.

In addition, setting is performed such that, in the second direction, the size of the erroneous mounting preventing recessed portion 238 is larger than the size of the erroneous mounting preventing protrusion portion 516, and, at a position where the surface on the second guide groove 231*b* side of the plate-shaped attachment portion 51 comes into contact with the bottom surface of the second guide groove 231*b*, a gap is provided between the side surface on the second guide groove 231*b* side of the erroneous mounting preventing protrusion portion 516 and the surface of the erroneous mounting preventing recessed portion 238 that opposes the side surface. For this reason, when the attachment portion 51 moves to the second guide groove 231*b* side in the second direction B, the attachment portion 51 comes into contact with the bottom surface of the second guide groove 231*b* before the erroneous mounting preventing protrusion portion 516 comes into contact with the surface of the erroneous mounting preventing recessed portion 238. Accordingly, the erroneous mounting preventing protrusion portion 516 is kept from coming into contact with the surface of the erroneous mounting preventing recessed portion 238. For this reason, a force for moving the attachment portion 51 to the second guide groove 231*b* side is kept from acting on the erroneous mounting preventing protrusion portion 516.

Note that setting may be performed such that, also in the first direction A, at a position where the surface on the farther-side receiving portion 232 side of the plate-shaped attachment portion 51 comes into contact with the farther-side receiving portions 232, a gap is provided between the surface on the farther-side receiving portion 232 side of the erroneous mounting preventing protrusion portion 516 and a surface of the erroneous mounting preventing recessed portion 238 that opposes the surface of the erroneous mounting preventing protrusion portion 516. Accordingly, when the attachment portion 51 is about to move to the farther side, the attachment portion 51 comes into contact with the farther-side receiving portions 232 before the erroneous mounting preventing protrusion portion 516 comes into contact with the surface of the erroneous mounting preventing recessed portion 238. Accordingly, the erroneous mounting preventing protrusion portion 516 is kept from coming into contact with the surface of the erroneous mounting preventing recessed portion 238 when the attachment portion 51 is attached at propter orientation.

In this manner, the interlock connector 5 is attached to the seal member 2 so as to be movable relative to the seal member 2 along the virtual floating plane.

<Fitting Portion>

Figure 13:
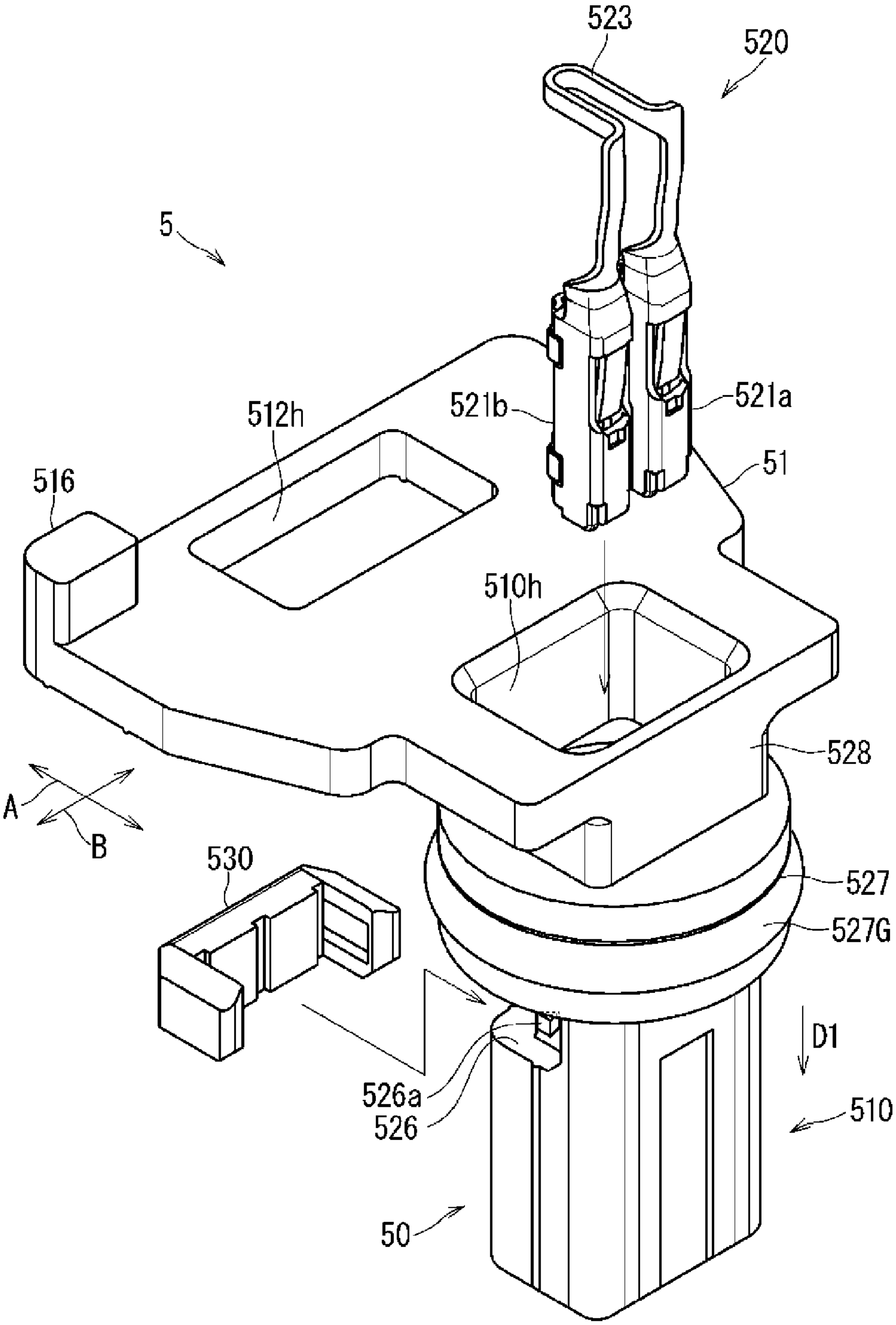
FIG. 13 is an exploded perspective view of the interlock connector.
Figure 14:
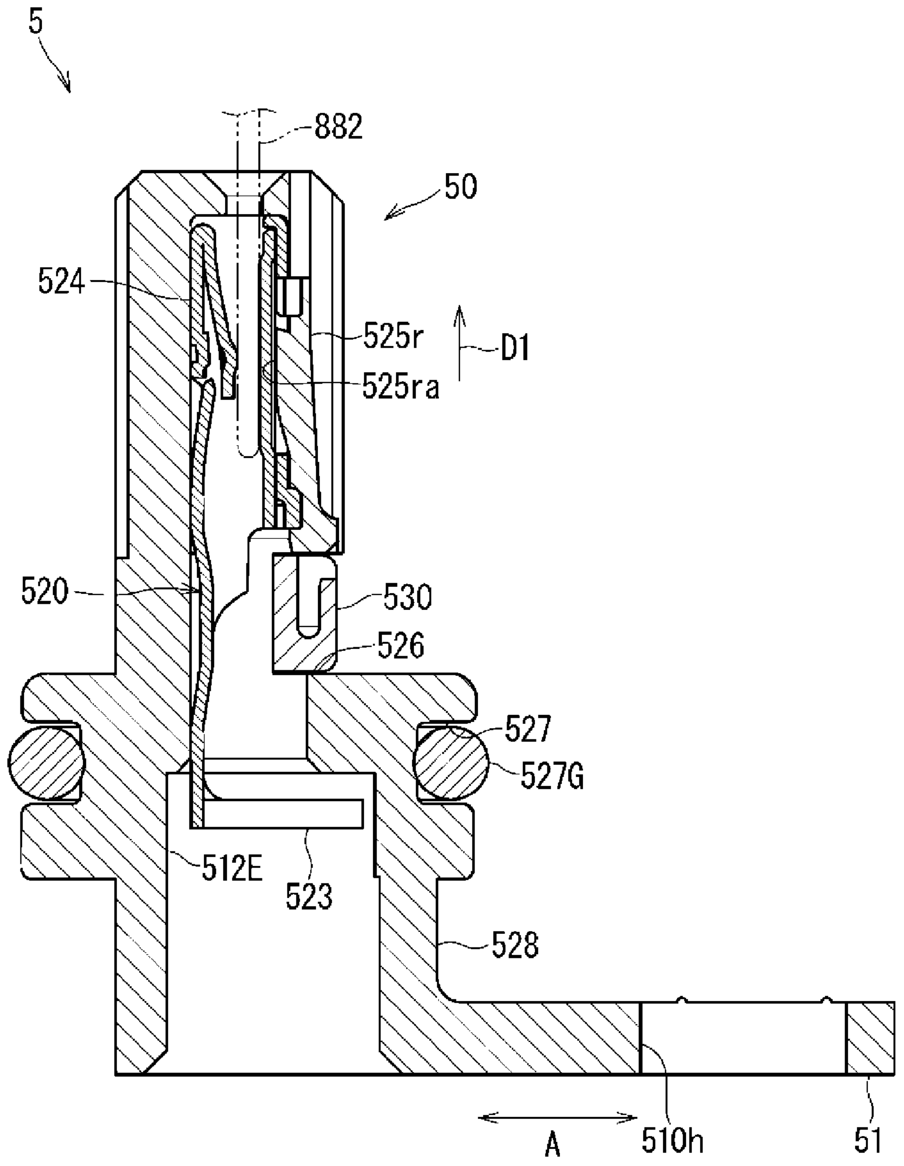
FIG. 14 is a cross-sectional view taken along the line XIV-XIV in FIG. 10.

The fitting portion 50 will be described in more detail. FIG. 13 is an exploded perspective view of the interlock connector 5. FIG. 14 is a cross-sectional view taken along the line XIV-XIV in FIG. 10.

As shown in FIGS. 10, 11, 13, and 14, the fitting portion 50 includes a terminal housing portion 510, a terminal unit 520, and a retainer 530.

The terminal housing portion 510 is a portion that is to be mated with the partner connector 880 in a state the terminal unit 520 is accommodated. In the present embodiment, the terminal housing portion 510 is an elongated portion made of a resin. The above attachment portion 51 is formed on the base end of the terminal housing portion 510 in an integral manner from the same resin using a metal mold.

More specifically, the terminal housing portion 510 includes two terminal housing chambers 524 and a coupling portion housing chamber 524E. The two terminal housing chambers 524 are elongated space, and are formed so as to be parallel to each other in an inner portion on the leading end side of the terminal housing portion 510. The two terminal housing chambers 524 are open to the leading end side of the terminal housing portion 510. Pin-shaped or tab-shaped partner terminals 882 of the partner connector 880 are respectively inserted into the terminal housing chambers 524 through the openings. The coupling portion housing chamber 524E is formed on the base end side of the two terminal housing chambers 524, in the terminal housing portion 510. The coupling portion housing chamber 524E is space that is continuous to both of the two terminal housing chambers 524. An attachment opening 510*h* is formed so as to pass through the plate-shaped attachment portion 51 from the base end of the terminal housing portion 510. The attachment opening 510*h* is joined to the coupling portion housing chamber 524E, in the fitting portion 50.

The terminal housing portion 510 includes two lance portions 525*r* corresponding to the two terminal housing chambers 524. The lance portions 525*r* are elongated elastic pieces extending along the longitudinal direction of the terminal housing chambers 524, and are supported so as to be elastically deformable inward and outward relative to the terminal housing chambers 524. Engaging protrusion portions 525*ra* that can be engaged with later-described tubular terminals 521*a* and 521*b* are formed on portions of the lance portions 525*r* that are oriented to the terminal housing chamber 524 side.

Retainer attachment recessed portions 526 are formed at positions of the terminal housing portion 510 that correspond to the base end side of the two terminal housing chambers 524. The retainer attachment recessed portions 526 are recessed from the surrounding outer surface of the terminal housing portion 510. Engaging protrusion portions 526*a* that are engaged with the retainer 530 while preventing coming-off are formed at two side portions of the retainer attachment recessed portions 526. Base end portions of the two terminal housing chambers 524 are exposed to the outside via the retainer attachment recessed portions 526.

The retainer 530 that is attached to the retainer attachment recessed portions 526 is a resin component formed in a U-shape. When the retainer 530 is fitted into the retainer attachment recessed portions 526, the engaging protrusion portions 526*a* engage with the inner side of the two end portions of the retainer 530. In this state, inner portions at intermediate positions in the width direction of the retainer 530 protrude into the two terminal housing chambers 524, and engage with the base ends of the tubular terminals 521*a* and 521*b* in the terminal housing portion 510 while preventing coming-off.

A rubber ring attachment groove 527 is formed in a portion on the base end side of the terminal housing portion 510 relative to a portion of the terminal housing portion 510 in which the above two terminal housing chambers 524 are formed. A rubber ring 527G is attached to this rubber ring attachment groove 527.

An intervening coupling portion 528 is formed at a base end portion of the rubber ring attachment groove 527. The outer peripheral surface of the intervening coupling portion 528 extends in a direction perpendicular to the virtual floating plane. A boundary portion between the outer peripheral surface of the intervening coupling portion 528 and the attachment portion 51 may be rounded.

The coupling portion housing chamber 524E is formed in the retainer attachment recessed portion 526 and the intervening coupling portion 528, which have been described above. The coupling portion housing chamber 524E extends larger than the terminal housing chambers 524, in the first direction A, and extends in the second direction B so as to connect the two terminal housing chambers 524.

The terminal unit 520 includes a first tubular terminal 521*a*, a second tubular terminal 521*b*, and a terminal coupling portion 523. The first tubular terminal 521*a* and the second tubular terminal 521*b* are formed in a tubular shape, such that the partner terminals 882 of the partner connector 880 can be inserted thereinto. The first tubular terminal 521*a* and the second tubular terminal 521*b* may be so called female terminals.

The terminal coupling portion 523 is a portion that electrically connects the first tubular terminal 521*a* and the second tubular terminal 521*b*. In a state where the interlock connector-equipped cover 1 is attached to the attachment target 800, and the connector 5 and the connector 880 are mated with each other, the two tubular terminals 521*a* and 521*b* of the connector 5 and the two partner terminals 882 of the connector 880 are electrically connected, respectively. Accordingly, the two partner terminals 882 are short-circuited to each other via the two tubular terminals 521*a* and 521*b* and the terminal coupling portion 523. In this manner, when the interlock connector-equipped cover 1 is attached to the attachment target 800, the two partner terminals 882 of the connector 880 are short-circuited to each other, and thus a predetermined circuit connected to the two partner terminals 882 can recognize that the interlock connector-equipped cover 1 has been attached to the attachment target 800. Thus, the predetermined circuit can perform appropriate processing in accordance with the interlock connector-equipped cover 1 having been attached to the attachment target 800.

The first tubular terminal 521*a*, the second tubular terminal 521*b*, and the terminal coupling portion 523, which have been described above, are integrally formed by pressing a metal plate. The metal plate is a copper plate or a copper-alloy plate, for example. The terminal unit 520 may be plated. The metal plate is punched into expanded shapes of the first tubular terminal 521*a* and the second tubular terminal 521*b*, and an elongated portion that connects base end portions of the expanded shape portions is formed by punching the metal plate in a state of being connected to the expanded shape portions, in order to form the terminal coupling portion 523. The expanded shape portions are then bent into tubes, and thereby the first tubular terminal 521*a* and the second tubular terminal 521*b* are manufactured in an integral form in which the first tubular terminal 521*a* and the second tubular terminal 521*b* are connected by the terminal coupling portion 523.

The terminal coupling portion 523 may extend in a direction that intersects a direction in which the first tubular terminal 521*a* and the second tubular terminal 521*b* are aligned (in the present embodiment, the second direction B), and intersects the fitting direction D1 (in the present embodiment, the first direction A). More specifically, the first tubular terminal 521*a* and the second tubular terminal 521*b* include extension portions that extend to the base end side along the axial directions of the tubes, and the terminal coupling portion 523 has a shape that extends along the first direction from the ends of the extension portions of the first tubular terminal 521*a* and the second tubular terminal 521*b*, and that is folded in a U-shape. By using the portion folded in a U-shape, a hand of a person or a robot hand can easily grip the terminal unit 520. When a robot hand is used, a robot hand shaped as tweezers may be used, for example.

The terminal unit 520 is accommodated in the terminal housing portion 510 as follows. A hand of a person or a robot hand grips the terminal coupling portion 523, for example, and the terminal unit 520 is inserted into the terminal housing chambers 524 through the attachment opening 510*h* of the attachment portion 51. When the first tubular terminal 521*a* and the second tubular terminal 521*b* are inserted into the two terminal housing chambers 524, the engaging protrusion portions 526*a* of the lance portions 525*r* engage with recessed portions of the first tubular terminal 521*a* and the second tubular terminal 521*b*. In this state, the terminal coupling portion 523 is positioned in the coupling portion housing chamber 524E. Then, when the retainer 530 is attached to the retainer attachment recessed portion 526, the retainer 530 protrude into the two terminal housing chambers 524, and engage with base ends of the first tubular terminal 521*a* and the second tubular terminal 521*b* while preventing coming-off. Accordingly, the first tubular terminal 521*a* and the second tubular terminal 521*b* are held in the two terminal housing chambers 524.

Figure 15:
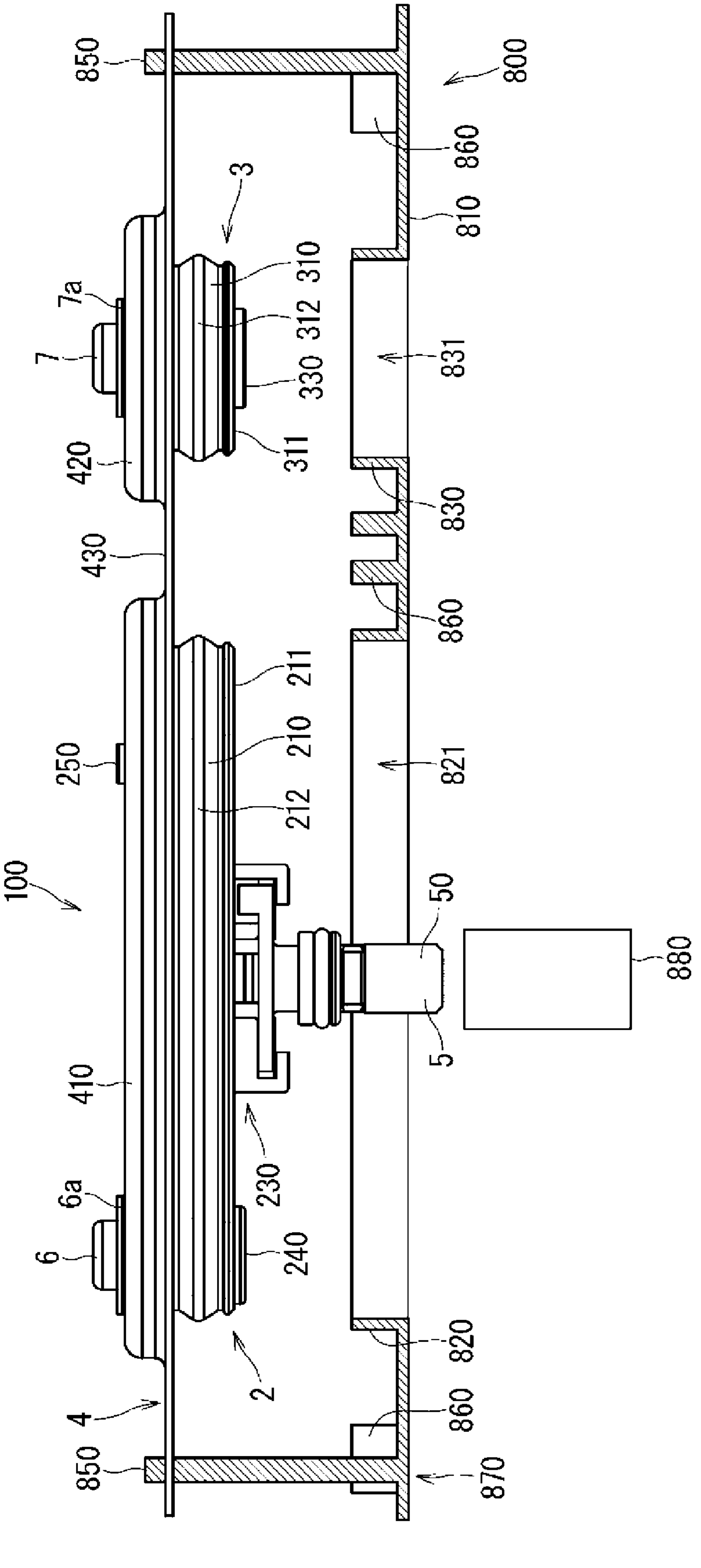
FIG. 15 is a schematic diagram showing an example of a process of attaching the interlock connector.
Figure 16:
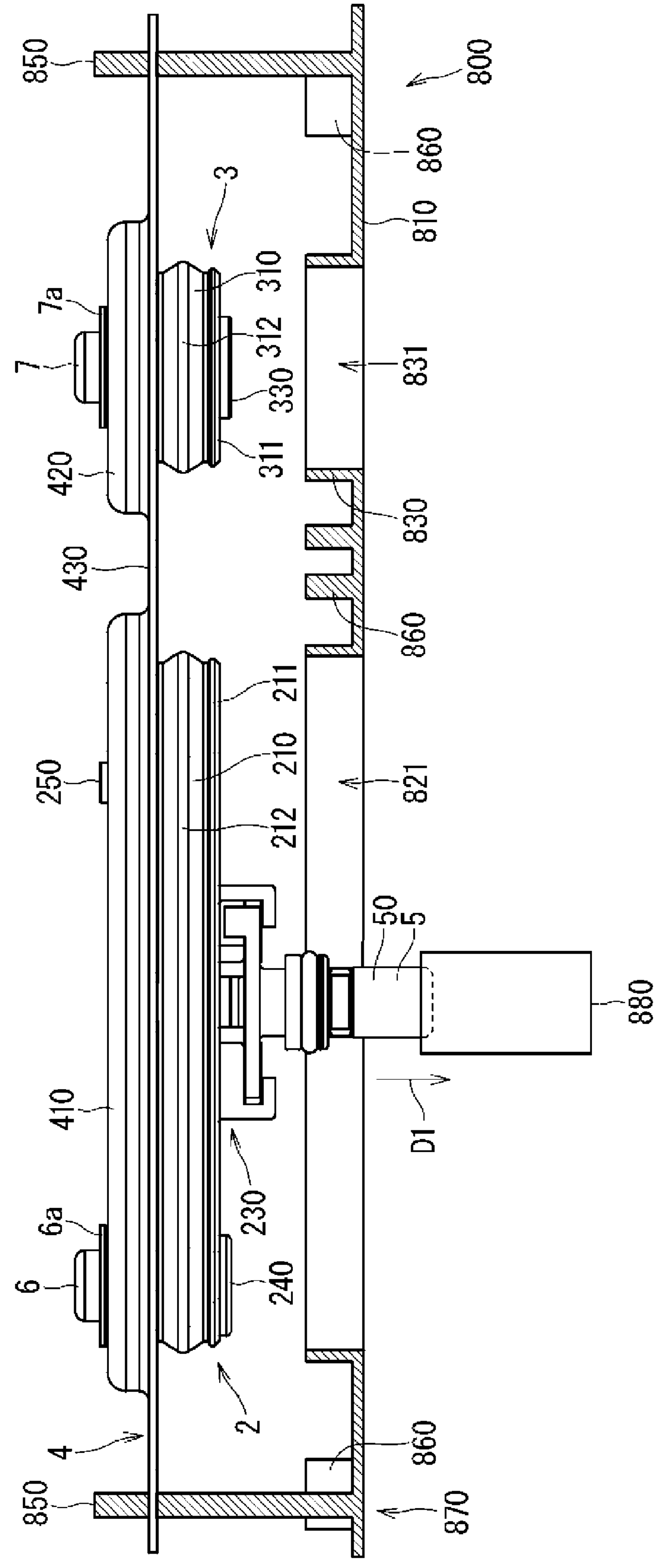
FIG. 16 is a schematic diagram showing an example of a method for attaching the interlock connector.
Figure 17:
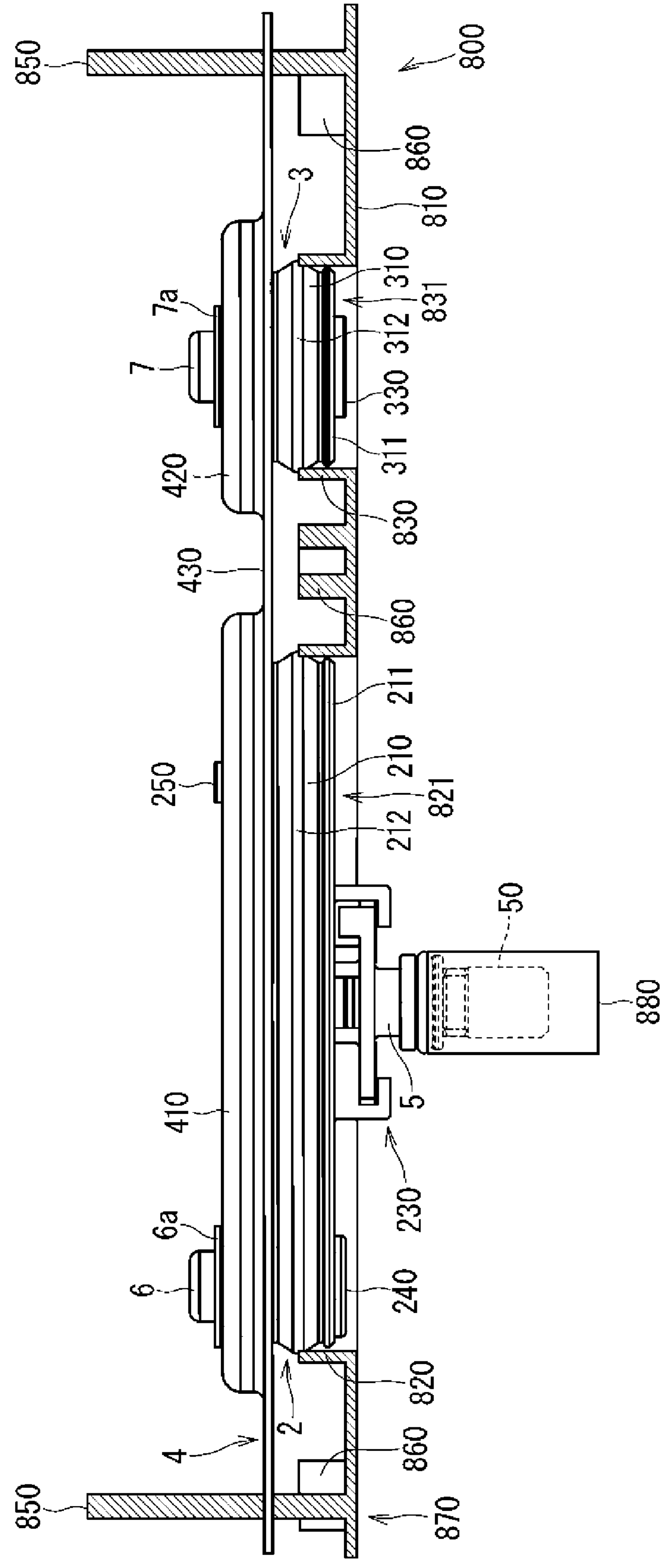
FIG. 17 is a schematic diagram showing an example of a method for attaching the interlock connector.
Figure 18:
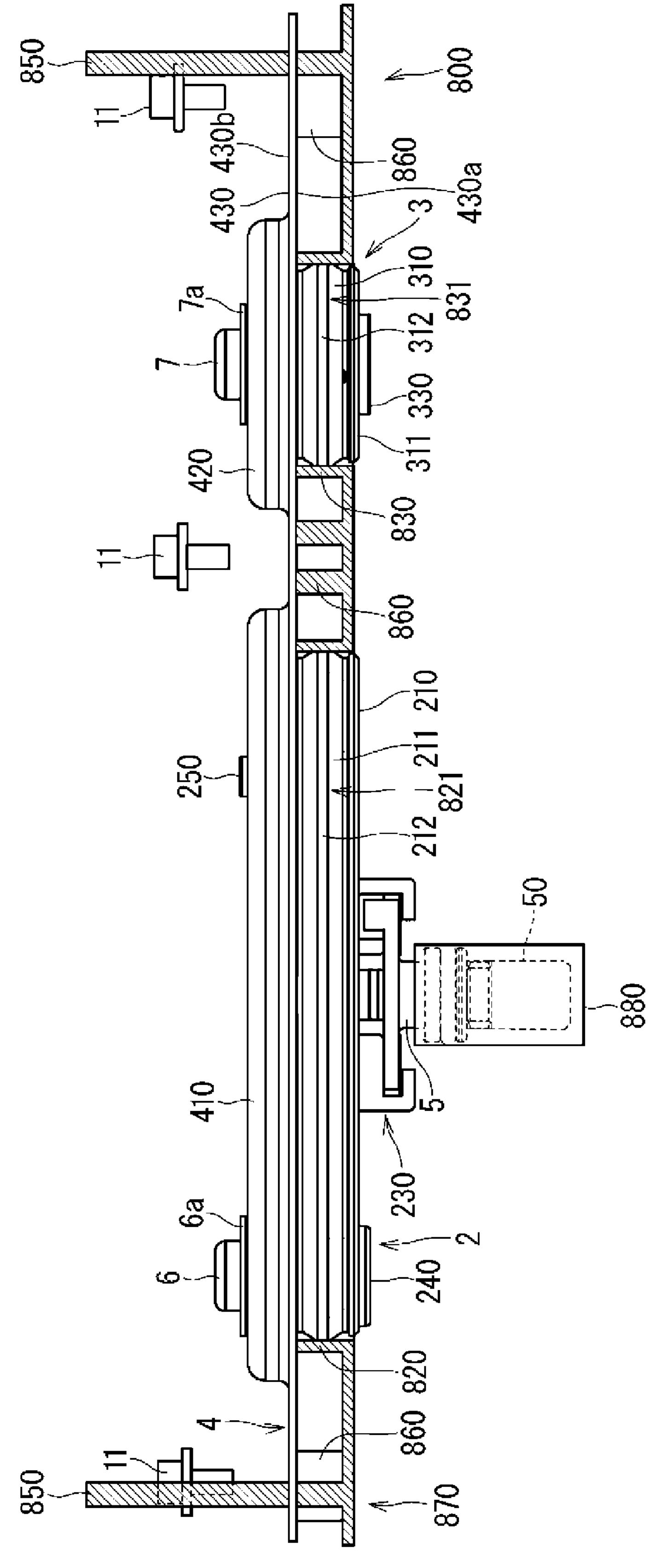
FIG. 18 is a schematic diagram showing an example of a method for attaching the interlock connector.

Example of Method for Attaching Interlock Connector-Equipped Cover to Attachment Target FIGS. 15 to 18 are schematic diagrams showing an example of a method for attaching the interlock connector-equipped cover 1 to the attachment target 800. FIGS. 15 to 18 show a cross-sectional structure of the attachment target 800 taken along the arrow A-A shown in FIG. 4. FIGS. 15 to 17 show an example of process of attaching the interlock connector, FIG. 16 shows a process advanced further than the process in FIG. 15, and FIG. 17 shows a process advanced further than the process in FIG. 16. FIG. 18 shows an example of a state where attachment of the interlock connector is completed.

As shown in FIG. 15, in a state where the seal members 2 and 3 and the interlock connector 5 are oriented to the attachment target 800 side, the plurality of regulation pins 850 of the attachment portion 870 of the attachment target 800 are respectively inserted into the plurality of through holes 431 of the shield cover 4. By the regulation pins 850 being inserted into the through holes 431, the attachment position of the interlock connector-equipped cover 1 in a direction that extends along the specific plane is regulated.

It can be said that the regulation pins 850 are guide pins for guiding movement of the interlock connector-equipped cover 1 to the attachment target 800.

When the interlock connector-equipped cover 1 is brought close to the attachment target 800 in a state where the regulation pins 850 are inserted into the through holes 431, a leading end of the interlock connector 5 of the interlock connector-equipped cover 1 starts to be mated with the partner connector 880 of the attachment target 800, as shown in FIG. 16. At this time, the connector 5 is movable relative to the seal member 2 along the virtual floating plane, and thus an operator can easily mate the connector 5 with the connector 880. Furthermore, the seal member 2 to which the connector 5 is attached is movable relative to the shield cover 4 along the virtual floating plane, and thus an operator can more easily mate the connector 5 with the connector 880.

In this example, the size of the seal member 2 in a direction that extends along the fitting direction D1 of the connector 5 (in FIG. 16, the size in the up-down direction) is set such that the seal portion 210 of the seal member 2 is not fitted into the opening portion 821 of the attachment target 800 in a state where the regulation pins 850 are inserted into the through holes 431 and the leading end of the connector 5 starts to be mated with the connector 880. In addition, the size of the seal member 3 in a direction that extends along the fitting direction D1 is set such that the seal portion 310 of the seal member 3 is not fitted into the opening portion 831 of the attachment target 800 in a state where the regulation pins 850 are inserted into the through holes 431, and the leading end of the connector 5 start to be mated with the connector 880.

When the interlock connector-equipped cover 1 is brought closer to the attachment target 800, and the connector 5 is further mated with the connector 880, the seal portions 210 and 310 start to be fitted into the opening portions 821 and 832 of the attachment target 800, as shown in FIG. 17. At this time, the regulation pins 850 are inserted into the through holes 431 of the shield cover 4, and the connector 5 is partially mated with the connector 880, and thus the seal portions 210 and 310 start to be fitted into the opening portions 821 and 832 in a state where the positions of the connector 5 and the shield cover 4 in a direction that extends along the virtual floating plane (specific plane) are regulated.

In this example, the connector 5 is movable relative to the seal member 2 along the virtual floating plane (specific plane), and the seal member 2 is movable relative to the shield cover 4 along the specific plane. Accordingly, the seal member 2 is movable along the specific plane independently from the connector 5 and the shield cover 4. Therefore, as shown in the example in FIG. 17, even when the seal portion 210 starts to be fitted into the opening portion 821 in a state where the positions of the connector 5 and the shield cover 4 in a direction that extends along the specific plane is regulated, the seal portion 210 can be easily fitted into the opening portion 821.

In addition, the seal member 3 is movable relative to the shield cover 4 along the specific plane, and thus an operator can easily fit the seal portion 310 of the seal member 3 into the opening portion 831.

When the interlock connector-equipped cover 1 is brought closer to the attachment target 800, and the seal portions 210 and 310 are further fitted into the opening portions 821 and 831, the main surface 430*a* of the base portion 430 of the shield cover 4 hit the leading end surfaces of the bosses 860 of the attachment portion 870 of the attachment target 800 as shown in FIG. 18. Accordingly, movement of the interlock connector-equipped cover 1 is completed. In a state where the shield cover 4 hits the leading end surfaces of the bosses 860, the connector 5 is appropriately mated with the connector 880, and the seal portions 210 and 310 are appropriately fitted into the opening portions 821 and 831. That is to say, in a state where the shield cover 4 hits the leading end surfaces of the bosses 860, the opening portions 821 and 831 are appropriately sealed by the interlock connector-equipped cover 1.

Thereafter, a plurality of fixing bolts 11 are respectively inserted into the plurality of through holes 432 provided in the shield cover 4, and are respectively screwed to the plurality of bosses 860 of the attachment target 800. Accordingly, the shield cover 4 is fixed to the attachment target 800, and attachment of the interlock connector-equipped cover 1 to the attachment target 800 is completed.

Note that the seal portion 210 may start to be fitted into the opening portion 821 before the connector 5 starts to be mated with the connector 880. Also in this case, the seal member 2 is movable relative to the shield cover 4 along the specific plane, and thus the seal portion 210 can be easily fitted into the opening portion 821.

With the interlock connector-equipped cover 1 configured as descried above, the attachment portion 51 is held by the connector holding portion 230 so as to be movable along the first direction A and the second direction B, and thus the interlock connector 5 is supported by the seal member 3 so as to be movable along the virtual floating plane. The attachment portion 51 is a plate-shaped attachment portion 51 that extends from the base end of the fitting portion 50 along the virtual floating plane that intersects the fitting direction D1, and thus it is possible to reduce the protrusion amount of the interlock connector 5. The fitting portion 50 does not include a trapezoid portion whose size gradually increases toward the attachment portion 51, and the plate-shaped attachment portion 51 may be directly exposed from the outer peripheral surface of the fitting portion 50 that extends along the fitting direction D1, for example. The plate-shaped attachment portion 51 realizes a floating holding structure in which the attachment portion 51 is movable along the virtual floating plane. For this reason, it is possible to reduce the amount of protrusion of the interlock connector 5 from the seal member 2. In addition, when the first side portion 512*a* is inserted into the first guide groove 231*a*, and the second side portion 512*b* is inserted into the second guide groove 231*b*, the erroneous mounting preventing protrusion portion 516 is received by the erroneous mounting preventing recessed portion 238, but, conversely, when an attempt is made to insert the first side portion 512*a* into the second guide groove 231*b*, and insert the second side portion 512*b* into the first guide groove 231*a*, the erroneous mounting preventing protrusion portion 516 interferes with the opening of the second guide groove 231*b*. Accordingly, erroneous mounting of the interlock connector 5 is suppressed.

In addition, even when there is an error between the position at which the shield cover 4 is attached to the attachment target 800 and the position at which the seal member 2 is attached to the opening portion 821, such an error can be resolved due to the clearance C1 between the screw 6 and the shield cover 4. Even when there is an error between the position at which the seal member 2 is attached to the opening portion 821 and the position at which the interlock connector 5 is mated with the partner connector 880, such an error can be resolved due to the floating supporting structure of the interlock connector 5.

In addition, setting is performed such that, in a state where the erroneous mounting preventing protrusion portion 516 is positioned in the erroneous mounting preventing recessed portion 238, the first side portion 512*a* comes into contact with the bottom surface of the first guide groove 231*a*, or the second side portion 512*b* comes into contact with the bottom surface of the second guide groove 231*b* before or at the same time as the erroneous mounting preventing protrusion portion 516 coming into contact with the surface of the erroneous mounting preventing recessed portion 238, in the second direction B. For this reason, an unreasonable force is less likely to act on the erroneous mounting preventing protrusion portion.

In addition, the attachment guide surfaces 512*a*2 and 512*b*2 are respectively formed on the first side portion 512*a* and the second side portion 512*b*, and thus the attachment portion 51 can be easily inserted into the first guide groove 231*a* and the second guide groove 231*b*.

In addition, the amount (A1-A2) by which the attachment portion 51 is movable in the first direction A and the amount (B1-B2) by which the attachment portion 51 is movable in the second direction B are larger than the amount (Da-Db) by which the first side portion 512*a* and the second side portion 512*b* are movable respectively within the first guide groove 231*a* and the second guide groove 231*b* in the fitting direction D1. Accordingly, while the connector holding portion 230 supports the interlock connector 5 at a fixed position to a certain degree in the fitting direction D1, the interlock connector 5 can easily move along the virtual floating plane in accordance with the position of the partner connector 880.

In addition, the first tubular terminal 521*a* and the second tubular terminal 521*b*, and furthermore, the terminal coupling portion 523 are integrally formed by pressing a metal plate, and thus it is possible to easily manufacture the terminal unit 520 in which the first tubular terminal 521*a* and the second tubular terminal 521*b* are electrically connected. In addition, the terminal unit 520 in which the first tubular terminal 521*a* and the second tubular terminal 521*b* are held with a certain positional relation is easily accommodated in the terminal housing portion 510. An operation of gripping the terminal coupling portion 523, and inserting the first tubular terminal 521*a* and the second tubular terminal 521*b* into the pair of terminal housing chambers 524 at the same time may be easily performed, for example.

In addition, the terminal coupling portion 523 extends in a direction that intersects the direction in which the first tubular terminal 521*a* and the second tubular terminal 521*b* are aligned and that intersects the fitting direction D1, and thus it is possible to reduce the size in the fitting direction D1 of the terminal coupling portion 523. Accordingly, it is possible to reduce the space for accommodating a structure portion for coupling two terminals in the fitting direction D1, and to further reduce the length of protrusion of the interlock connector 5 from the seal member 2.

Note that the configurations described in the above embodiment and the modification can be combined as appropriate provided that no contradiction arises.

LIST OF REFERENCE NUMERALS

1 Interlock connector-equipped Cover
2 First seal member
3 Second seal member
4 Shield cover
5 Interlock connector
6 First screw

7 Second screw
6*a*, 7*a* Washer
6*b*, 7*b* Screw portion
10 Rotation stop protrusion portion
11 Fixing bolt
42 Rotation stop hole
50 Fitting portion
51 Attachment portion
100 Cover portion
210 First seal portion
310 Second seal portion
211, 311 Main body portion
211*a*, 211*b*, 311*a*, 311*b* Flat surface
212, 312 Seal ring
220, 320 Flange portion
230 Connector holding portion
231 Slidably supporting portion
231*a* First guide groove
231*b* Second guide groove
232 Farther-side receiving portion
233 Coming-off preventing elastic piece
234 Elastic piece
235 Coming-off preventing protrusion portion
235*f* Inclined surface
238 Erroneous mounting preventing recessed portion
239 Interference portion
240, 330 Boss
241, 331 Leading end surface
242, 332 Lower hole
243, 333 Outer bottom surface
250 Regulating protrusion portion
260, 270, 340 Abutment rib
280, 281, 360 Thinned portion
410 First placing recessed portion
411, 412, 415, 421, 431, 432 Through hole
413 Dish-shaped recessed portion
420 Second placing recessed portion
422 Rotation stop hole
430 Base portion
430*a*, 430*b* Main surface
510 Terminal housing portion
510*h* Attachment opening
512 Wide portion
512*a* First side portion
512*b* Second side portion
512*a*1, 512*b*1 Parallel portion
512*a*2, 512*b*2 Attachment guide surface
512*h* Coming-off preventing recessed portion
514 Narrow portion
514*p* Protruded rim portion
516 Erroneous mounting preventing protrusion portion
520 Terminal unit
521*a* First tubular terminal
521*b* Second tubular terminal
523 Terminal coupling portion
524 Terminal housing chamber
524E Connection portion housing chamber
525*r* Lance portion
525*ra* Engaging protrusion portion
526 Retainer attachment recessed portion
526*a* Engaging protrusion portion
527 Rubber ring attachment groove
527G Rubber ring
528 Intervening coupling portion
530 Retainer
800 Attachment target
810 Base portion
810*a*, 810*b* Main surface
820 First tubular portion
821 First opening portion
830 Second tubular portion
831 Second opening portion
850 Regulation pin
860 Boss
870 Attachment portion
880 Partner connector
882 Partner terminal
4130 Recessed surface
4150 Opening
A First direction
B Second direction
C1 First clearance
C2 Second clearance
C3 Third clearance
D1 Fitting direction

What is claimed is:

1. An interlock connector-equipped cover that is to be attached to an attachment target including an opening portion, and covers the opening portion, the interlock connector-equipped cover comprising:

a cover portion that includes a seal member that is fitted into the opening portion and closes the opening portion; and an interlock connector that is supported by the seal member and is for ensuring attachment of the cover portion to the attachment target, wherein the interlock connector includes: a fitting portion that extends from the seal member toward a partner connector in the attachment target and is to be mated with the partner connector, and a plate-shaped attachment portion that extends from a base end of the fitting portion along a virtual floating plane intersecting a fitting direction of the fitting portion, the seal member includes a connector holding portion that holds the interlock connector so as to allow the interlock connector to move along the virtual floating plane, the attachment portion includes: a first side portion, a second side portion that is on the opposite side to the first side portion, and an erroneous mounting preventing protrusion portion that protrudes from the first side portion in a direction intersecting the first side portion, the attachment portion is shaped so as to include a wide portion and a narrow portion, one side portion of the wide portion being the first side portion and the other side portion of the wide portion being the second side portion, the connector holding portion includes: a first guide groove and a second guide groove for respectively guiding the first side portion and the second side portion along a first direction extending along the virtual floating plane, a farther-side receiving portion for regulating a position of the attachment portion on one side along the first direction, and a coming-off preventing elastic piece that has a coming-off preventing protrusion portion on a leading end thereof, and prevents and restricts coming-off of the attachment portion on the other side along the first direction, the wide portion and the narrow portion are continuous in the first direction and are disposed at different positions in the first direction, the attachment portion is movable within a range restricted between the farther-side receiving portion and the coming-off preventing protrusion portion in the first direction, and is movable within a range restricted between a bottom surface of the first guide groove and a bottom surface of the second guide groove in a second direction that intersects the first direction on the virtual floating plane, in a state where the first side portion and the second side portion are respectively guided by the first guide groove and the second guide groove and the attachment portion is held on the connector holding portion, and the connector holding portion further includes an erroneous mounting preventing recessed portion that is formed so as to be continuous to the first guide groove at a position displaced relative to the first guide groove in a direction that intersects the first direction, and receives the erroneous mounting preventing protrusion portion.

2. The interlock connector-equipped cover according to claim 1, wherein the cover portion includes: a shield cover that includes a through hole and is to be fixed to the attachment target, and a screw that passes through the through hole and is fixed to the seal member, there is a clearance in the through hole, and the seal member is movable relative to the shield cover along the virtual floating plane in accordance with the clearance.

3. The interlock connector-equipped cover according to claim 1, wherein setting is performed such that the first side portion comes into contact with the bottom surface of the first guide groove or the second side portion comes into contact with the bottom surface of the second guide groove before or at the same time as the erroneous mounting preventing protrusion portion coming into contact, in the second direction, with a surface of the erroneous mounting preventing recessed portion, in a state where the erroneous mounting preventing protrusion portion is positioned in the erroneous mounting preventing recessed portion.

4. The interlock connector-equipped cover according to claim 1, wherein portions on the one side in the first direction of the first side portion and the second side portion are formed as attachment guide surfaces whose widths gradually decrease from the other side in the first direction toward the one side, the attachment guide surfaces are positioned on the narrow portion side of the first side portion and the second side portion of the wide portion, and the farther-side receiving portion restricts a position of the narrow portion on one side along the first direction.

5. The interlock connector-equipped cover according to claim 1, wherein an amount by which the attachment portion is movable between the farther-side receiving portion and the coming-off preventing protrusion portion in the first direction and an amount by which the attachment portion is movable between the bottom surface of the first guide groove and the bottom surface of the second guide groove in the second direction are larger than an amount by which the first side portion and the second side portion are respectively movable in the first guide groove and the second guide groove in the fitting direction.

6. The interlock connector-equipped cover according to claim 1, wherein the fitting portion includes a first tubular terminal, a second tubular terminal, a terminal coupling portion that electrically connects the first tubular terminal and the second tubular terminal, and a terminal housing portion that accommodates the first tubular terminal and the second tubular terminal, and the first tubular terminal, the second tubular terminal, and the terminal coupling portion are integrally formed by pressing a metal plate.

7. The interlock connector-equipped cover according to claim 6, wherein the terminal coupling portion intersects a direction in which the first tubular terminal and the second tubular terminal are aligned, and extends in a direction that intersects the fitting direction.

8. The interlock connector-equipped cover according to claim 1, wherein, in a state where the first side portion and the second side portion are respectively guided to the first guide groove and the second guide groove while two side portions of the narrow portion are not guided to the first guide groove and the second guide groove, and, in a state where the attachment portion is held on the connector holding portion, the attachment portion is movable within a range restricted between the farther-side receiving portion and the coming-off preventing protrusion portion in the first direction.

* * * * *